(12) United States Patent
Wang

(10) Patent No.: US 8,787,459 B2
(45) Date of Patent: Jul. 22, 2014

(54) VIDEO CODING METHODS AND APPARATUS

(75) Inventor: Jason N. Wang, Palo Alto, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 375 days.

(21) Appl. No.: 12/942,909

(22) Filed: Nov. 9, 2010

(65) Prior Publication Data

US 2012/0114039 A1    May 10, 2012

(51) Int. Cl.
*H04N 11/02* (2006.01)
*H04N 7/12* (2006.01)

(52) U.S. Cl.
CPC . *H04N 11/02* (2013.01); *H04N 7/12* (2013.01)
USPC .................. 375/240.13; 375/240.12

(58) Field of Classification Search
CPC .............................. H04N 11/02; H04N 11/12
USPC ............... 340/240.13; 375/E07.243, 375/240.13–240.18; 382/239, 246, 232; 345/555
See application file for complete search history.

(56) References Cited

U.S. PATENT DOCUMENTS

| | | | |
|---|---|---|---|
| 5,959,672 A | 9/1999 | Sasaki | |
| 7,554,468 B2 | 6/2009 | Xu | |
| 7,570,832 B2 | 8/2009 | Chui et al. | |
| 7,596,279 B2* | 9/2009 | Sugimoto et al. | 382/238 |
| 2002/0036643 A1* | 3/2002 | Namizuka et al. | 345/555 |
| 2004/0234144 A1* | 11/2004 | Sugimoto et al. | 382/239 |
| 2006/0056711 A1* | 3/2006 | Lee et al. | 382/232 |
| 2006/0098886 A1* | 5/2006 | De Haan | 382/253 |
| 2006/0285590 A1* | 12/2006 | Guleryuz | 375/240.12 |
| 2008/0025403 A1* | 1/2008 | Sato et al. | 375/240.16 |
| 2008/0144720 A1* | 6/2008 | Etoh et al. | 375/240.16 |
| 2009/0010337 A1 | 1/2009 | Wang | |
| 2009/0010338 A1 | 1/2009 | Wang | |
| 2009/0034857 A1* | 2/2009 | Moriya et al. | 382/238 |
| 2009/0207911 A1 | 8/2009 | Minamoto | |
| 2009/0220011 A1 | 9/2009 | Kursawe et al. | |
| 2010/0118945 A1 | 5/2010 | Wada et al. | |
| 2010/0208818 A1* | 8/2010 | Yin et al. | 375/240.15 |
| 2011/0268183 A1* | 11/2011 | Sole et al. | 375/240.03 |

FOREIGN PATENT DOCUMENTS

FR    EP 1 619 651 A1 *    7/2004

OTHER PUBLICATIONS

PCT International Search Report dated Dec. 19, 2011 for International Application No. PCT/US11/48204.
Gary Sullivan et al., "Draft of Version 4 of H.264/AVC (ITU-T Recommendation H.264 and ISO/IEC 14496-10 (MPEG-4 part 10) Advanced Video Coding)", 14th Meeting: Hong Kong, Jan. 18-21, 2005.

(Continued)

*Primary Examiner* — Dave Czekaj
*Assistant Examiner* — Dramos I Kalapodas
(74) *Attorney, Agent, or Firm* — Joshua D. Isenberg; JDI Patent

(57) ABSTRACT

In methods for encoding and decoding digital pictures certain prediction parameters may be omitted from the output on the encoder side or the input on the decoder side. An encoder can identify prediction parameter values that can be omitted by determining whether a decoder emulator can reproduce the prediction parameter values from other information, such as predicted pixel and prediction error values of one or more previously decoded sections from the same or a different picture.

35 Claims, 9 Drawing Sheets

(56) References Cited

OTHER PUBLICATIONS

Sony Computer Entertainment Incorporated, "Cell Broadband Engine Architecture", Version 1.0, Aug. 8, 2005.
U.S. Appl. No. 11/627,867 to Jason N. Wang entitled "Picture Encoding Using Same-Picture Reference for Pixel Reconstruction".
Sven Klomp and Jörn Ostermann (2011). Motion Estimation at the Decoder, Effective Video Coding for Multimedia Applications, Dr Sudhakar Radhakrishnan (Ed.), ISBN: 978-953-307-177-0, InTech, Available from: http://www.intechopen.com/books/effective-video-coding-for-multimedia-applications/motion-estimation-at-the-decoder.
Kamp, S., Evertz, M., & Wien, M., "Decoder Side Motion Vector Derivation for Inter Frame Video Coding", 15th IEEE International Conference on Image Processing, (ICIP 2008), Oct. 12-15, 2008, pp. 1120-1123.

* cited by examiner

VIDEO CODING METHODS AND APPARATUS

FIELD OF THE INVENTION

Embodiments of the present invention are related to digital video and more specifically to methods and apparatus for implementing a video coding standard.

BACKGROUND OF THE INVENTION

Digital signal compression is widely used in many multimedia applications and devices. Digital signal compression using a coder/decoder (codec) allows streaming media, such as audio or video signals to be transmitted over the Internet or stored on compact discs. A number of different standards of digital video compression have emerged, including H.261, H.263; DV; MPEG-1, MPEG-2, MPEG-4, VC1; and AVC (H.264). These standards, as well as other video compression technologies, seek to efficiently represent a video frame picture by eliminating or reducing spatial and temporal redundancies within a given picture and/or among successive pictures. Through the use of such compression standards, video content can be carried in highly compressed video bit streams, and thus efficiently stored in disks or transmitted over networks.

MPEG-4 AVC (Advanced Video Coding), also known as H.264, is a video compression standard that offers significantly greater compression than its predecessors. The H.264 standard is expected to offer up to twice the compression of the earlier MPEG-2 standard. The H.264 standard is also expected to offer improvements in perceptual quality. As a result, more and more video content is being delivered in the form of AVC (H.264)-coded streams. Two rival DVD formats, the HD-DVD format and the Blu-Ray Disc format support H.264/AVC High Profile decoding as a mandatory player feature. AVC (H.264) coding is described in detail in ISO/IEC 14496-10:2009, "Information technology—Coding of audio-visual objects—Part 10: Advanced Video Coding, Edition 5" May 13, 2009, which is incorporated herein by reference. A copy may be downloaded at the following URL: http://www.iso.org/iso/iso_catalogue/catalogue_tc/catalogue_detail.htm?csnumber=52974.

The predecessor to H.264 (MPEG-2) had a structure that predicted the current picture from a reference picture. This standard provided a tool to remove data dependency between the current picture and the previous picture. Specifically, MPEG-2 calculated 2-D motion vector for moving a group of pixels between previous picture and current picture. H.264 looks at many motion vectors within a 16×16 block. The current picture has a bunch of pixels that are similar to pixels in the previous picture. The idea is that the chunk of pixels moved from a location in the previous picture to a different location in the current picture. There could be motion within each 16×16 block. H.264 could code many motion vectors within each 16×16 block. It is impractical to encode motion vector for every pixel because eventually the number of motion vectors would exceed the number of pixels, in which case it would be preferable to transmit the pixels instead of the motion vectors. Thus, there is a tradeoff therefore between the number of motion vectors and the number of pixels. H.264 encodes motion vectors for groups of pixels as small as a 4×4 block of pixels. This standard is well balanced between pixels and motion vectors. But other than that, H.264 uses basically the same process and same data flow as MPEG-2.

It is within this context that embodiments of the present invention arise.

BRIEF DESCRIPTION OF THE DRAWINGS

Embodiments of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

In developing a new coding standard for digital video, it is desirable to reduce the number of bits that are required to transmit the information for each digital video frame. Generally, a video frame is an image represented by a two-dimensional array of pixels. Each pixel may have an intensity (luminance) value and one or more color (chrominance) values. By way of example, a typical video signal has two chrominance values, Cb (blue-difference) and Cr (red-difference). For encoding and decoding purposes, the image is typically broken down into groups of pixels of different sizes.

Figure 1A:
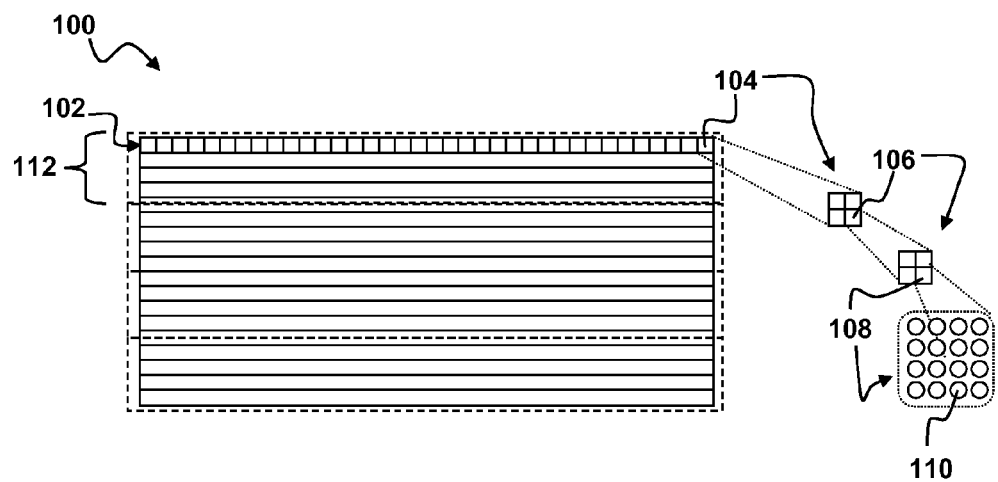
FIG. 1A is a schematic diagram illustrating one possible division of a video picture within the context of embodiments of the present invention.

By way of example, and not by way of limitation, as shown in FIG. 1, a single digital video picture 100 (e.g., a digital video frame) may be broken down into one or more sections. As used herein, the term "section" refers to a group of one or more pixels within the picture 100. A section can range from a single pixel within the picture, up to the whole picture. Non-limiting examples of sections include slices 102, macroblocks 104, sub-macroblocks 106, blocks 108 and individual pixels 110. As illustrated in FIG. 1A, each slice 102 may contain one or more rows of macroblocks 104 or portions of one or more such rows. The number of macroblocks in a row depends on the size of the macroblocks and the size and resolution of the picture 100. For example, if each macroblock contains sixteen by sixteen pixels then the number of macroblocks in each row may be determined by dividing the width of the picture 100 (in pixels) by sixteen. Each macroblock 104 may be broken down into a number of sub-macroblocks 106. Each sub-macroblock 106 may be broken down into a number of blocks 108 and each block may contain a number of pixels 110. By way of example, and without limitation of the invention, in a common video coding scheme, each macroblock 104 may be broken down into four sub-macroblocks 106. Each sub-macroblock may be broken down into four blocks 108 and each block may contain a four by four arrangement of sixteen pixels 110.

Conventionally, digital video images have been decoded using a single thread for the decoding of each picture or the decoding of each slice. In a conventional single-thread decoder all decoding tasks for one macroblock are completed before decoding the next macroblock. Multithreaded picture decoding—i.e., decoding multiple pictures in parallel, may also be done. To facilitate multi-threaded decoding within pictures, each picture 100 may be broken down into two or more sub-units 112 that encompass one or more slices. In embodiments of the present invention it is possible for a slice 102 to "straddle" the boundary between to adjacent sub-units 112. Thus, a slice may be shared between two different sub-units.

It is noted that each picture may be either a frame or a field. A frame refers to a complete image. A field is a portion of an image used for to facilitate displaying the image on certain types of display devices. Generally, the pixels in an image are arranged in rows. To facilitate display an image may sometimes be split by putting alternate rows of pixels into two different fields. The rows of pixels in the two fields can then be interlaced to form the complete image. For some display devices, such as cathode ray tube (CRT) displays, the two fields may simply be displayed one after the other in rapid succession. The afterglow of the phosphors used in the CRT screen combined with the persistence of vision results in the two fields being perceived as a continuous image. For other display devices, such as liquid crystal displays, it may be necessary to interlace the two fields into a single picture before being displayed. Streaming data representing encoded images typically includes information indicating whether the image is a field or a frame. Such information may be included in a header to the image. Embodiments of the present invention allow a video codec to find redundancies within a currently processing picture without having to break the picture into fields.

Pixel prediction is a technique used to utilize video content redundancy for compression. For example, in prior art video coding standards, if the current pixel block could be predicted by a previous decoded pixel block with a 2-dimensional shift, the prediction method is referred to as inter-prediction (when the reference block is from a different image) or intra-prediction (when the reference block is from the same image) and the prediction parameter is a 2D vector (known as a motion vector) which is used to define the shift. After prediction, the prediction error pixels (sometimes called residual pixels) are encoded into the compressed video stream using some type of quantization transform (e.g., a wavelet transform such as a discrete cosine transform). In general, more complex prediction methods require more bits to transmit prediction parameters and yield a better prediction result. And so, at a certain point, the bits used to transmit a good and complex prediction will exceed the bits saved by smaller residual pixel values. At this point, better and more complex prediction is no longer justified.

Many established video compression standards use pixel prediction, such as H.261, H.263, MPEG 1, MPEG 2, MPEG 4, and H.264/AVC. In all of these prior art video coding standards, it is the encoder's responsibility to search for the best balance between prediction method, bit cost, and prediction result accuracy. The encoder then transmits both prediction parameters and residual pixels to the decoder for pixel reconstruction, requiring a large number of bits. As such, the efficiency in transmitting prediction parameters is very poor and the most complex prediction method available with the prior art video standards is a simple 2-D shift.

Shifting the encoder's responsibility to the decoder in order to implement more accurate prediction methods has failed as a solution in the past because the computational complexity in searching for prediction parameters is very high. It is impractical to use low-cost hardware or general purpose CPUs to handle such a task. This is the overriding reason in limiting pixel prediction methods to a simple 2-D shift. As such, there has been little motivation to develop more complex prediction methods.

However, as GPUs become cheaper and more flexible, 3-D based prediction methods will be become feasible in the near future. For 3-D video compression, 3-D motion based prediction is much more attractive than the current 2-D multi-view solution. In a multi-view video stream each view is a 2D picture sequence. Multi-view video stream can be used to transmit 3-D video content. Multi-view could also be used for other video content transmit ion, for example, to transmit the output from multiple cameras recording a sporting event. If multi-view video is used for 3D video, each view stream represents a different view angle. So, the simplest 3D video multi-view stream has 2 views. If 2 views are used, the viewer has to use shutter glasses so that the viewer's left and right eyes perceive the different views to experience 3D. Alternatively, the 3D video system can present images of different views fixed at a single view point to experience 3D without glasses. But, to make glass free 3D video practical, many views are likely used. As the number of views in the video stream increases, multi-view encoding becomes less efficient than true 3D picture encoding. Consequently, the number of bits needed to transmit 3-D motion parameters could be up to 10 times larger than that of 2-D motion. The invented method is designed to reduce the number of bits needed to encode 3-D prediction parameters.

The foundation of pixel prediction and reconstruction can be illustrated by the following example. When a camera constructs a video sequence, it collects photons through its lens once per a given time duration. These photons are emitted by surfaces of many objects in front of the camera. The similarity of the texture and shape of these object surfaces is called intra-image redundancy. The similarity between two time instances is called inter-image redundancy. To discover intra-similarity or inter-similarity and use these similarities to carry out pixel prediction, the key is to find the relationship between two similar object surfaces.

Currently, pixel prediction and reconstruction using two-dimensional motion compensation cannot be further optimized using the same basic process as H.264. A fundamental change is required. Two possible concepts behind fundamental changes are (A) to use a single motion vector (or other prediction parameter) to encode as many pixels as possible, and/or (B) to decrease the number of bits needed to encode the motion vector (or other prediction parameter).

To illustrate the use of a single motion vector to encode as many pixels as possible, let us consider the following example. By way of example, and not by way of limitation, consider a situation where an image contains a rotating wheel. As the wheel rotates, different sections of the wheel move in different directions at different speeds. In a conventional encoding standard, the wheel would be broken down into a large number of small groups of pixels and each group would require a different 2-D motion vector. This requires a large number of motion vectors, each describing the two-dimensional motion of an individual small group of pixels, to represent the motion of the wheel.

To reduce the number of 2-D motion vectors need to represent the wheel's motion, the wheel could be treated as a three-dimensional object projected in 2-D space. Here, the wheel could be encoded using a 3-D motion vector that includes parameters for rotational and translational motion. In this scenario, the 3-D motion vector would cover a much greater number of pixels, thereby reducing the number of motion vectors needed to describe wheel's motion, with the tradeoff being that each 3-D motion vector would require a greater number of bits to transmit because of the additional parameters involved with each 3-D motion vector.

The existing hardware support (e.g., the graphics processing unit or GPU) on many video devices has very good 3-D rotational motion representation, 3-D translation motion representation, and 3-D scaling. Encoding motion amongst images using a 3-D motion vector would result in a more complex (e.g., more parameters) motion vector, but far fewer overall motion vectors to represent motion. Moreover, projecting 3-D information into a 2-D image may create redundancies between the scaling and rotation parameters associated with the 3-D vector. Thus, one of these parameters may be skipped during the encoding process, thereby reducing the complexity of this prediction method.

In addition to using 3-D translation, rotation, and scaling to parameterize the 3-D motion vector, the motion vector could encode color characteristics. This may include a 3-parameter vector to represent light strength (i.e., chrominance and luminance) as well as a single parameter to represent light diffusion. Light strength parameters are likely to be stable across the whole image. For example, if the lighting of a picture becomes more reddish, the chrominance values for all pixels may be shifted toward the red by equal (or determinable) amounts. Likewise, diffusion (i.e., blurriness in the image) is likely to be constant across an image. As such, the encoder can greatly reduce the number of bits needed to encode this information by removing redundant information from motion vectors for different sections.

Building on the above example, any surface that appear in two or more places, either within the same image or within independent images may be represented as a 3-D movement coupled with a change in lighting conditions. For 2-D image compression, this movement may be characterized as a 3-D shift plus a 3-D rotation. The lighting conditions could be characterized by a light-strength vector. The 3-D shift could be parameterized as a 3-parameter vector. The 3-D rotation along three rotation axes could likewise be parameterized as a 3-parameter vector. The light-strength vector could be parameterized as a 3-parameter vector. Two parameters would be used to represent the two color difference components (i.e., blue-luma and red-luma) that describe chrominance and another parameter would represent the luminance. Additionally, the 3-D motion vector may have another parameter to describe light diffusion and finally a parameter that points to the reference image being used to construct the 3-D motion vector (this parameter is unnecessary for intra-coding). The 3-D motion vector would be characterized by 11 parameters, which would make for a highly accurate pixel prediction method. It is important to note that these 11 parameters can only be used to define a 2-D projection of 3-D surface motion. To represent true 3-D motion, more parameters would be necessary.

Because representing a large number of pixels with a single, complex 3-D motion vector would require the transmission of an extremely large number of bits, the second concept behind fundamentally altering pixel prediction and reconstruction involves decreasing the total number of bits needed to encode a given video stream. To reduce the number of bits, the encoder could use a decoder emulator to determine whether a motion vector could be skipped during the encoding process of a particular section of a digital image in the video stream. The decoder emulator would simulate the decoder's ability to independently determine the motion vector for the current section being processed using previously decoded images.

If the decoder emulator is able to establish enough of the parameters associated with the motion vector, then the entire motion vector could be skipped during the encoding process. Instead, guidelines requiring significantly less bits could be transmitted to the decoder to facilitate its search for the motion vector. By way of example, and not by way of limitation, these guidelines may include: 1) giving the decoder a set of ranges within which to locate parameters representing the most accurate motion vector; 2) constraining the decoder's motion vector search to particular neighboring pixels; 3) sending the difference (Δ) between the encoder's prediction parameter values (e.g., motion vector) and the decoder emulator's corresponding prediction parameter values; or 4) altering the section size the decoder uses to search for a motion vector. It is noted that these same concepts may be applied to prediction parameters other than motion vectors, such as filter parameters, diffusion, chrominance, and luminance values.

If the decoder emulator is able to establish all of the parameters associated with the motion vector, then no additional information (and no unnecessary bits) would need to be transmitted to the decoder.

Pixel prediction is the foundation of many video compression algorithms. In this invented method, the encoder could skip transmitting certain pixel prediction control parameters if the decoder could obtain these parameters by searching previously decoded pixels. Instead, only prediction parameter adjustments and prediction error pixels would be transmitted. By skipping prediction parameters, embodiments of the present invention can enable very complex and accurate 3-D pixel prediction for both intra-coded pictures and inter-coded pictures and yield very effectively compressed video streams. This method also scales better than current multi-view coding methods for 3-D video compression.

In embodiments of the present invention, an encoder applies a first set of prediction parameter values (e.g., components of a motion vector) to a section of a picture to obtain a set of predicted pixel values. The predicted pixel values can be subtracted from the original pixel values for the section to generate a prediction error (sometimes known as residual pixels). A forward transform is applied to the prediction error to generate a set of transform coefficients. Normally the transform coefficients and prediction parameters are transmitted for decoding. In embodiments of the present invention, a decoder emulator on the encoder side can use the transform coefficients and a previously decoded section from the same picture or a different picture to determine a second set of prediction parameters (e.g., components of the motion vector). The two sets of prediction parameters can be compared to each other to determine if any parameter values in the second set match corresponding values in the first set. It can be assumed that any matching values in the second set can be generated by a decoder from the prediction error. Any values in the first set that do not have a corresponding matching value in the second set can be transmitted to the decoder side in a third set of predication parameter values. The matching values can be omitted from the third set of prediction parameter values that is transmitted to the decoder side, thereby reducing the number of bits needed to transmit these parameter values.

A decoder side can receive the transform coefficients and a partial set of prediction parameters (which may be an empty set) corresponding to the coded section. The decoder may then apply an inverse transform to the transform coefficients to generate the prediction error values for the section. The decoder may use the prediction error values, a previously decoded section, and any non-omitted prediction parameter values in the partial set to decode the pixel values for the section.

Figure 1B:
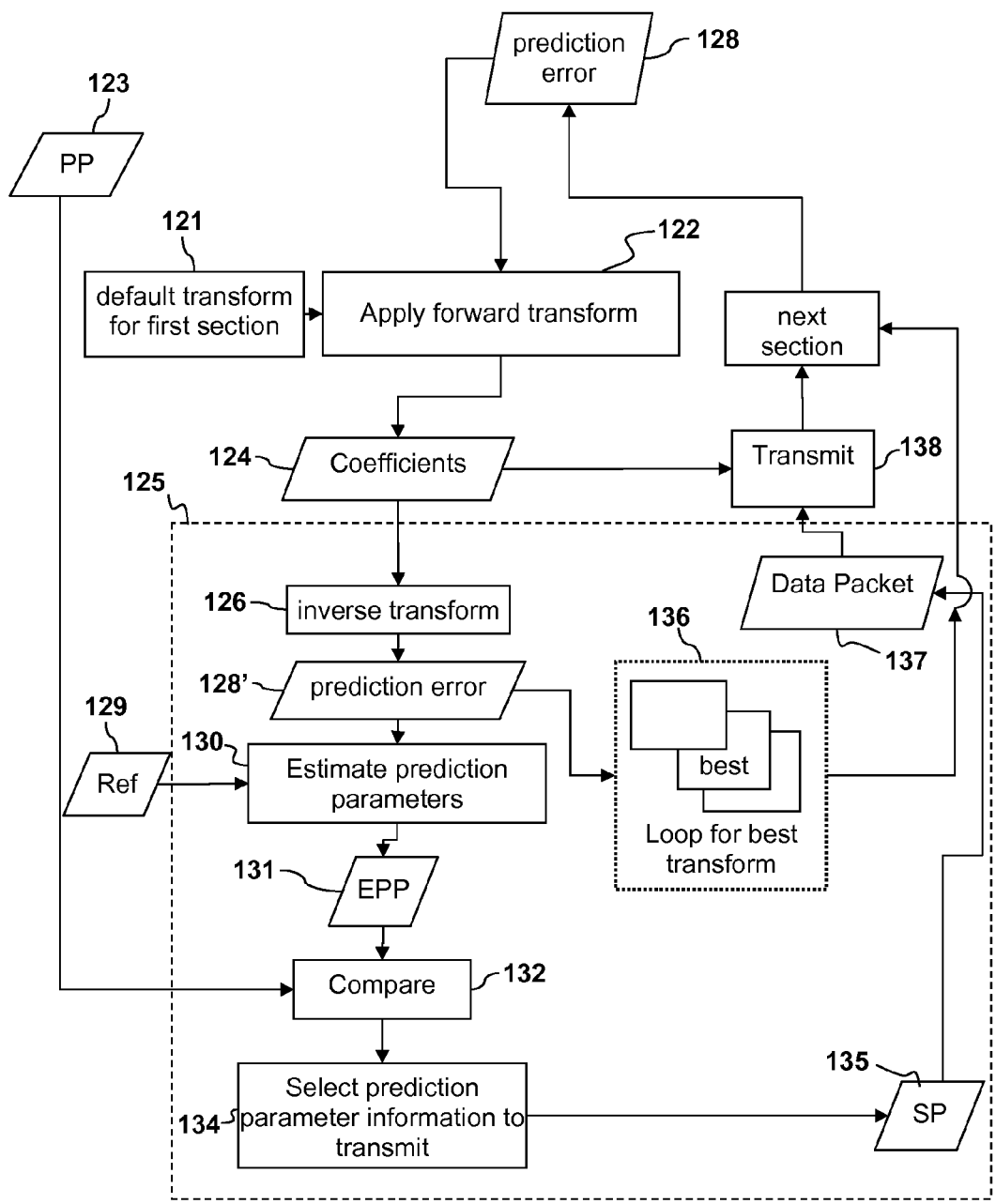
FIG. 1B is a flow diagram illustrating encoding of a digital picture in accordance with an embodiment of the present invention.

By way of example, and not by way of limitation, FIG. 1B depicts an example of a process flow 120 for encoding a digital picture while skipping prediction parameters. In this example, different forward transforms can be applied to each section in a picture. As indicated at 122, a decoder emulator 125 on the encoder can optionally apply a forward transform to an input prediction error 128 for a section (e.g., a top left block or macroblock) in a picture to generate a set of transform coefficients 124 and set of prediction parameters (e.g., a motion vector). In some embodiments, the encoder may apply a default forward transform 121 to a first section in the picture and determine a best transform for other sections, as discussed below. If the current section is not the first section, the transform 121 may be determined from the decoder emulator result for a previous section.

Once the forward transform has been applied, the decoder emulator 125 can apply a corresponding inverse transform to the resulting transform coefficients as indicated at 126 to re-generate a prediction error 128' (e.g., residual pixel values). The prediction error 128' generated by the decoder emulator 125 may be compared against the input prediction error 128 as a check. The decoder emulator 125 can then use a previously decoded reference section 129 to generate one or more estimated prediction parameter values 131 from the prediction error 128' as indicated at 130. The decoder emulator 125 can generate the estimated prediction parameter values 131 for the current section using predicted pixel and prediction error values of the previously decoded reference section 129. As indicated at 132, the estimated prediction parameter values 131 can be compared against a set of input prediction parameter values 123 generated by the encoder in another part of the encoding process. The estimated parameter values 131 can be compared against the input parameter values 123 to select input parameter values 135 for transmission. In particular, input parameter values 123 that match corresponding estimated parameter values 131 need not be transmitted. Input parameter values that do not match corresponding estimated parameter values may be selected for transmission along with the transform coefficients 124. By transmitting only selected prediction parameters 135 the number of bits transmitted may be reduced. In some implementations, the encoder emulator 125 may use the estimated prediction parameters 131 for the current section or the selected prediction parameters 135 for the current section to check the result for a future section, e.g., the next section.

By way of example, and not by way of limitation, reconstructed pixel values (predicted pixel value plus decoded prediction error) can be compared against reference pixel values from one or more decoded reference sections 129 to estimate a motion vector (e.g., a three-dimensional motion vector). The components of the estimated motion vector can be compared against an original motion vector generated by the encoder in another part of the encoding process. Components of the original motion vector that do not match those generated by the decoder emulator 125 can be selected for transmission along with the transform coefficients.

The entire set of prediction parameter values (e.g., an entire motion vector) is sometimes transmitted, e.g., if there is no suitable previously decoded section. For example, for the very first picture partition, then entire motion vector has to be transmitted.

It is noted that different transforms may work better for different parts of a given picture. To find a best transform 122, the encoder may apply different forward transforms to the prediction error to generate different transform coefficients. In some embodiments, the best transform loop 136, which may be implemented, e.g., within the decoder emulator 125, can compare different sets of transform coefficients obtained by applying the different forward transforms to the section and determine a best transform to use for a future section. In general there can be a group of candidate transforms that are controlled by transform parameters. The decoder emulator 125 can search for the best transform parameters for each particular section. Different transform parameters can be used to determine the entropy of output coefficients. The entropy of the coefficients corresponds to the number of bits needed to encode these coefficients. The transform that produces coefficients having the lowest entropy can be selected as the best transform. Because of the cost to transmit, only the best transform parameters for the previous section are used for the current section, i.e., one can always skip transform parameter transmission. The best transform determined by the best transform loop 136 for the current section can be passed to the encoding of a future section, if one exists. As used herein, the term "future section" has the following meaning. For the first section in a row (e.g., the first macroblock in a row of macroblocks), future sections include the next section in the same row and the first section in the next row, if any. For a section at the end of a row there is no future section. For all other sections, the future section is the next section in the same row.

Once a best transform has been selected the corresponding transform parameters can be applied to forward and inverse transforms for a future section (if one exists) in the process of generating estimated prediction parameter values. The selected prediction parameters 135 can be combined into a data packet 137, which can be transmitted along with the transform coefficients 124, as indicated at 138. The transform parameters for the best transform can, however, be omitted from the data packet 137. The process may then be repeated for the next section.

In addition, in selecting the parameters to transmit at 134, the decoder emulator 125 may further reduce the number of bits in the parameter data that is transmitted, e.g., using one or more of the techniques discussed above. Specifically, the selected parameter values 135 may include a set of ranges of values within which to locate particular parameter values. Alternatively, in the case of a motion vector, the selected parameter values may include constraints on the decoder's motion vector search to particular pixels within the reference section 129. Furthermore, the selected parameter values 135 may include differences between the encoder's prediction parameter values (e.g., motion vector) and the decoder emulator's corresponding prediction parameter values. Alternatively, the prediction parameter values may alter a section size the decoder uses to search for an omitted predication parameter. For example, the decoder emulator 125 may determine that the correct motion vector can be correctly estimated for an 8×8 pixel if a larger or smaller section size is used for the motion vector search. In such a case, the selected parameter values 135 may include an indication of the section size for the decoder to use to search for the predication parameter.

Figure 1C:
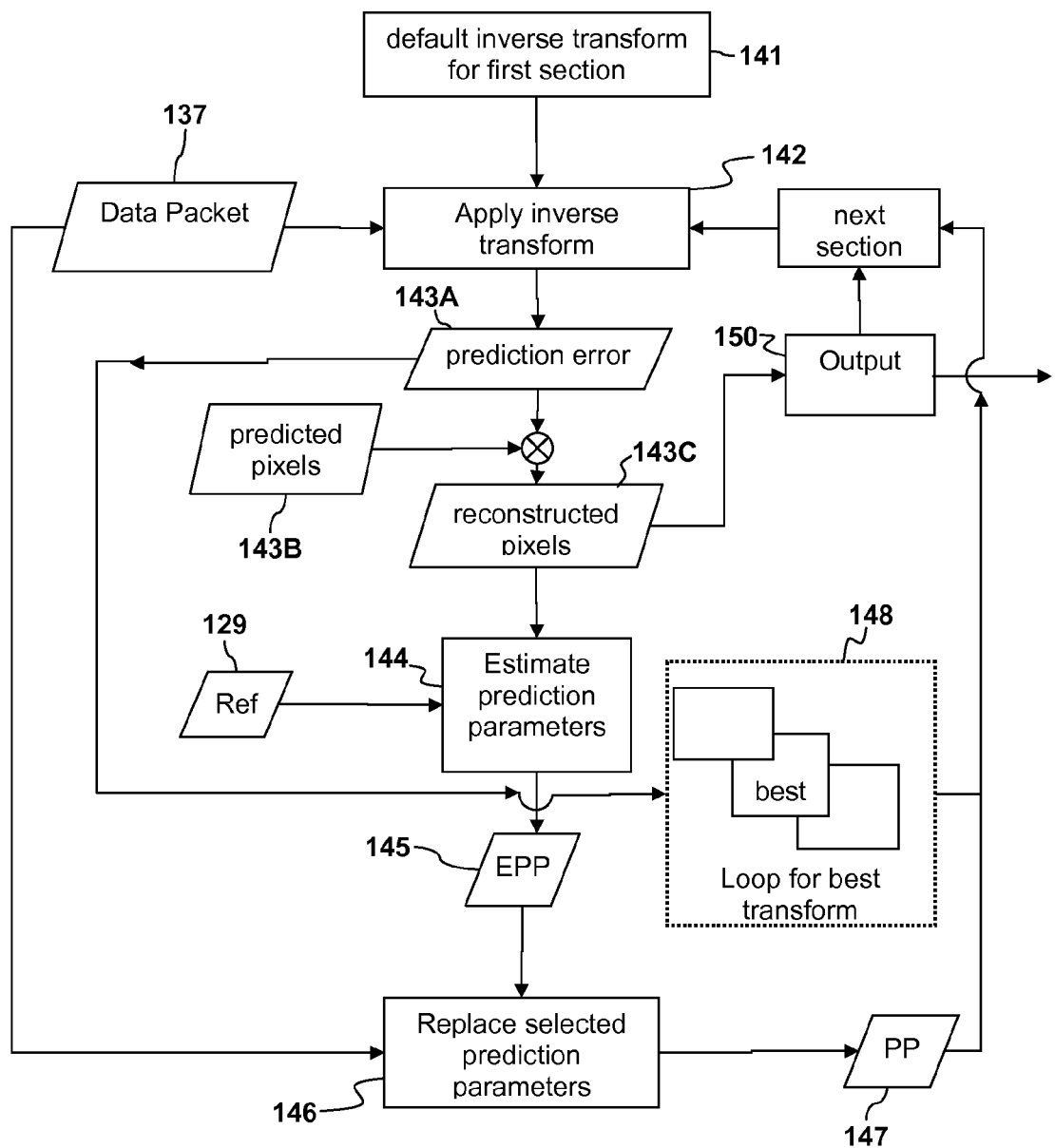
FIG. 1C is a flow diagram illustrating decoding of a digital picture in accordance with an embodiment of the present invention.

FIG. 1C illustrates an example of a process flow 140 for decoding pictures in accordance with an embodiment of the present invention. A decoder may receive one or more of the data packets 137 containing the transform coefficients and selected parameters for an encoded section in a picture. The decoder can then apply an inverse transform to the coefficients as indicated at 142 to obtain a prediction error 143A. If the decoder operates in the same fashion as the decoder emulator 125 on the encoder side, the prediction error 143A should match the prediction error 128' generated by the encoder emulator 125.

It is noted that if the section is a first section in the picture, the decoder may optionally apply a predetermined default transform 141 to the transform coefficients. Otherwise, as discussed below, the decoder can apply different inverse transforms to the coefficients and apply different corresponding forward transforms to the resulting prediction error and compare the resulting estimated coefficients to determine a best forward transform. The best forward transform is generally the one that results in the coefficients with smallest number of bits.

The prediction error 143A can be combined with corresponding predicted pixel values 143B to obtain reconstructed pixel values. The predicted pixel values 143B may be obtained by applying a motion vector to a previously decoded reference section 129 in a different part of the decoding process (not shown). As indicated at 144, the decoder can search for prediction parameters 145 using the previously reconstructed pixel values 143C obtained using predicted pixels 143B and prediction error 143A and one or more previously decoded reference sections 129. By way of example, and not by way of limitation, reconstructed pixel values 143C can be compared against reference pixel values from the one or more decoded reference sections 129 to estimate a motion vector (e.g., a three-dimensional motion vector). Preferably, the previously decoded reference section 129 is the same one used by the decoder emulator on the encoder side. To facilitate this, the data packets 137 may include data identifying the relevant reference sections. The decoder may generate an output set of prediction parameters 147 by replacing selected estimated prediction parameters 145 with values of corresponding parameters included in the data packet 137, as indicated at 146. The prediction parameters 147 may also be used to decode the future section, if one exists. Specifically, the prediction parameters 147 may be used to generate predicted pixels for the future section.

In addition, the selected parameter values in the data packets 137 may include information from which omitted prediction parameters may be estimated or derived. For example, the data packets 137 may include a set of ranges of values within which to locate particular parameter values. Alternatively, in the case of a motion vector, the data packets may include constraints on the decoder's motion vector search to particular pixels within the reference section 129. Furthermore, the data packets 137 may include differences between the encoder's prediction parameter values 123 (e.g., motion vector) and the corresponding estimated prediction parameter values 131 generated by the decoder emulator 125. The decoder may combine the difference values with the estimated prediction value parameters 145 (e.g., by addition or subtraction of each estimated parameter value and its corresponding difference value) to obtain the output set of prediction parameter values 147. Alternatively, the prediction parameter values may alter a section size the decoder uses to search for an omitted prediction parameter. For example, if the data packets 137 may include a section size for the decoder to use for estimating the prediction parameters at 144, e.g., in a motion vector search.

As noted above, the decoder may apply different inverse transforms to the transform coefficients and determine a best transform for a future section in a picture. For example, a best transform loop 148 may apply different forward transforms to the prediction error 143A and generate corresponding transform coefficients as discussed above. It is noted that the best transform loop 148 can operate in essentially the same fashion as the best transform loop 136 on the decoder emulator 125 shown in FIG. 1B. The results for each forward transform may be compared against each other to determine a best forward transform, e.g., the forward transform that produces transform coefficients having the smallest number of bits. This process can be used within the transform parameter search process to confirm that the correct inverse transform was used on the input coefficients in the data packet. It is noted that the best transform for a previous picture section might not be the best one for the current picture. However, avoid the bit cost of transmitting the best transform parameters the best transform for the previous section can be used for the current section. Once the best forward transform has been found, the decoder can output the corresponding reconstructed pixels 143C to a different part of the decoder process and use them in the normal manner as indicated at 150. For example, the reconstructed pixels 143C can be used to complete the decoding of the sections, e.g., as discussed below. The resulting decoded sections may then be displayed by a display device such as a video display, computer monitor, or printer as part of a decoded picture. The prediction parameters 147 can be used for decoding a future section, e.g., the next section.

From the foregoing description it can be seen that the best transform determined for a previous section can be used to do inverse transform to convert the transform coefficients for the current section into residual pixels (prediction error) 143A. Thus, it is possible to avoid the need for the encoder to transmit the transform parameters for the current picture.

Figure 2A:
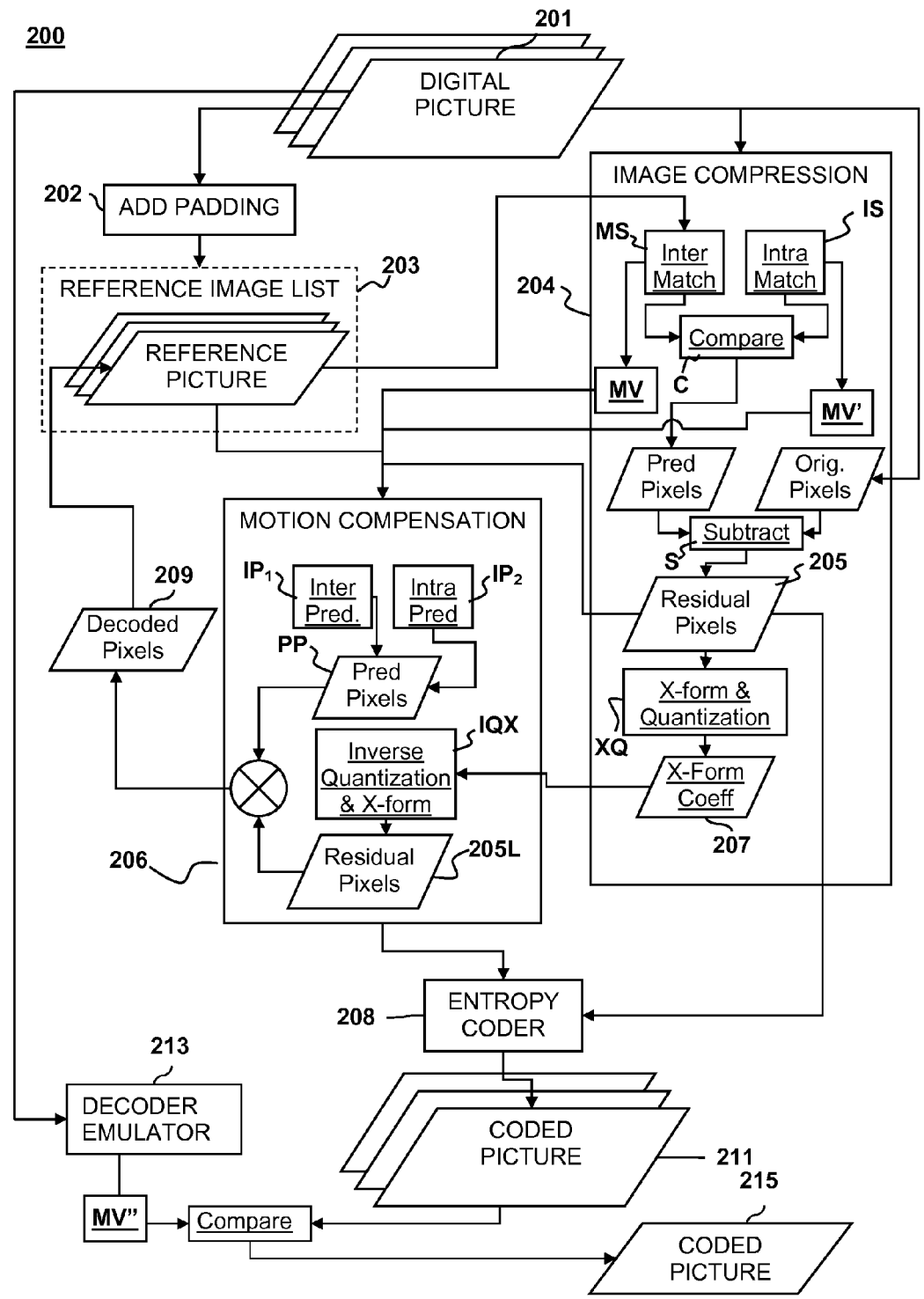
FIG. 2A is a flow diagram illustrating digital picture encoding according to an embodiment of the present invention.

Embodiments of the present invention may be used in conjunction with different encoding and decoding methods. By way of example, according to an embodiment of the present invention, an intra- or inter-picture may be encoded according to a method 200 as illustrated in FIG. 2A. The encoder receives a plurality of digital images 201 and encodes each image. Encoding of the digital picture 201 may proceed on a section-by-section basis. The encoding process for each section optionally involves padding 202, and generally involves image compression 204 and motion compensation 206. To facilitate a common process flow for both intra-coded and inter-coded pictures, all un-decoded pixels within a currently processing picture 201 may optionally be padded with temporary pixel values to produce a padded picture, as indicated at 202. The padded picture can be added to a list of reference pictures 203 stored in a buffer. Padding the picture at 202 facilitates the use of the currently-processing picture as a reference picture in subsequent processing during image compression 204 and motion compensation 206. Picture padding is described in greater detail in U.S. patent application Ser. No. 11/627,867 to Jason N. Wang entitled "PICTURE ENCODING USING SAME-PICTURE REFERENCE FOR PIXEL RECONSTRUCTION", the entire contents of which are incorporated herein by reference.

As used herein, image compression refers to the application of data compression to digital images. The objective of the image compression 204 is to reduce redundancy of the image data for a give image 201 in order to be able to store or transmit the data for that image in an efficient form of compressed data. The image compression 204 may be lossy or lossless. Lossless compression is sometimes preferred for artificial images such as technical drawings, icons or comics. This is because lossy compression methods, especially when used at low bit rates, introduce compression artifacts. Lossless compression methods may also be preferred for high value content, such as medical imagery or image scans made for archival purposes. Lossy methods are especially suitable for natural images such as photos in applications where minor (sometimes imperceptible) loss of fidelity is acceptable to achieve a substantial reduction in bit rate.

Examples of methods for lossless image compression include, but are not limited to Run-length encoding—used as default method in PCX and as one of possible in BMP, TGA, TIFF, Entropy coding, adaptive dictionary algorithms such as LZW—used in GIF and TIFF and deflation—used in PNG, MNG and TIFF. Examples of methods for lossy compression include reducing the color space of a picture 201 to the most common colors in the image, Chroma subsampling, transform coding, and fractal compression.

In color space reduction, the selected colors may be specified in the color palette in the header of the compressed image. Each pixel just references the index of a color in the color palette. This method can be combined with dithering to avoid posterization. Chroma subsampling takes advantage of the fact that the eye perceives brightness more sharply than color, by dropping half or more of the chrominance information in the image. Transform coding is perhaps the most commonly used image compression method. Transform coding typically applies a Fourier-related transform such as a discrete cosine transform (DCT) or a wavelet transform, followed by quantization and entropy coding. Fractal compression relies on the fact that in certain images, parts of the image resemble other parts of the same image. Fractal algorithms convert these parts, or more precisely, geometric shapes into mathematical data called "fractal codes" which are used to recreate the encoded image.

The image compression 204 may include region of interest coding in which certain parts of the image 201 are encoded with higher quality than others. Region of interest coding can be combined with a scalability feature that allows certain parts of the image 201 to be encoded first and other parts to be encoded later. Compressed data can contain information about the image (sometimes referred to as meta information or metadata) which can be used to categorize, search or browse images. Such information can include color and texture statistics, small preview images and author/copyright information.

By way of example, and not by way of limitation, during image compression at 204 the encoder may search for the best way to compress a block of pixels. The encoder can search all of the reference pictures in the reference picture list 203, which may include a currently padded picture, for a good match. If the current picture is coded as an intra picture, only the padded picture is available in the reference list. The image compression at 204 produces a three dimensional motion vector MV and transform coefficients 207 that are subsequently used along with one or more of the reference pictures (including the padded picture) during motion compensation at 206.

The image compression 204 generally includes a motion search MS for a best inter prediction match, an intra search IS for a best intra prediction match, an inter/intra comparison C to decide whether the current macroblock is inter-coded or intra-coded, and a subtraction S of the values of the original input pixels from the section being encoded with best match predicted pixel values to calculate a prediction error in the form of lossless residual pixels 205. The residual pixels then undergo a transform and quantization XQ to produce transform coefficients 207. The transform is typically based on a Fourier or Fourier-like transform, such as a discrete cosine transform (DCT). For existing video standards, if an intra picture is to be coded, the motion search MS and inter/intra comparison C are turned off. However, in embodiments of the present invention, since the padded picture is available as a reference, these functions are not turned off. Consequently, the image compression 204 is the same for intra-coded pictures and inter-coded pictures.

The motion search MS may generate a three-dimensional motion vector MV by searching the picture 201 for a best matching section for motion compensation as is normally done for an inter-coded picture. If the current picture 201 is an intra-coded picture, by contrast, existing codecs typically do not allow prediction across pictures. Instead all motion compensation is normally turned off for an intra picture and the picture coded by generating transform coefficients and performing pixel prediction. In embodiments of the present invention, however, an intra picture may be used to do inter prediction by matching a section in the current picture to another offset section within that same picture. The offset between the two sections may be coded as a prediction parameter, e.g., motion vector MV' (which may be a three-dimensional motion vector), that can be used for motion compensation at 206. By way of example, the encoder may attempt to match a section in an intra picture with some other offset section in the same picture then code the offset between the two as a three-dimensional motion vector MV'. The codec's ordinary motion vector compensation for an "inter" picture may then be used to do motion vector compensation on an "intra" picture. Certain existing codecs have functions that can convert an offset between two sections into a motion vector, which can be followed to do motion compensation at 206. However, these functions are conventionally turned off for encoding of intra pictures. In embodiments of the present invention, the codec may be instructed not to turn off such "inter" picture functions for encoding of intra pictures.

As used herein, motion compensation refers to a technique for describing a picture in terms of the transformation of a reference image to a currently processing image. In general, the motion compensation 206 acts as a local decoder within the encoder implementing the encoding process 200. Specifically, the motion compensation 206 includes inter prediction $IP_1$ and (optionally) intra prediction $IP_2$ to get predicted pixels PP using the motion vector MV or MV' from the image compression 204 and reference pixels from a picture in the reference list. It is noted that intra prediction is optional because, as a practical matter, only one of the two predictions $IP_1$ and $IP_2$ can be chosen to generate the predicted pixels PP. Inverse quantization and inverse transformation IQX using the transform coefficients 207 from the image compression 204 produce lossy residual pixels 205L which are added to the predicted pixels PP to generate decoded pixels 209. The decoded pixels 209 are inserted into the reference picture and are available for use in image compression 204 and motion compensation 206 for a subsequent section of the currently-processing picture 201. After the decoded pixels have been inserted, un-decoded pixels in the reference picture may undergo padding 202.

In a conventional encoder, if the current picture is intra coded, the inter-prediction portions of motion compensation 206 are turned off because there are no other pictures that can be used for motion compensation. However, in embodiments of the present invention, by contrast, motion compensation may be performed on any picture 201 independent of whether a particular picture is to be inter coded or intra coded. In embodiments of the present invention, the encoder implementing the method 200 may be modified to add the padded picture to the reference picture list 203 and the inter-prediction portions of the motion compensation 206 are not turned off, even if the currently processing image is to be intra coded. As a result, the process flow for both inter coded sections and intra coded sections is the same during motion compensation 206. The only major difference is the selection of the reference picture to be used for encoding.

By way of example, and not by way of limitation, in one type of three-dimensional motion compensation, each image may be partitioned into blocks of pixels (e.g. macroblocks of 16×16 pixels). Each block is predicted from a block of equal size in the reference frame. The blocks may be transformed to the position of the predicted block through parameterization of three-dimensional motion (i.e., 3D shift, 3D rotation). The blocks may also take on the color characteristics of the predicted block through parameterization of the strength of lighting and diffusion of light. These three-dimensional movements and changes in color characteristics are represented by a three-dimensional motion vector MV. To exploit the redundancy between neighboring block vectors, (e.g. for a single moving object covered by multiple blocks) it is common to encode only the difference between a current and previous three-dimensional motion vector in a bit-stream. The result of this differencing process is mathematically equivalent to a global motion compensation capable of panning. Further down the encoding pipeline, the method 200 may optionally use entropy coding 208 to take advantage of the resulting statistical distribution of the motion vectors around the zero vector to reduce the output size.

It is possible to shift a block by a non-integer number of pixels, which is called sub-pixel precision. The in-between pixels are generated by interpolating neighboring pixels. Commonly, half-pixel or quarter pixel precision is used. The computational expense of sub-pixel precision is much higher due to the extra processing required for interpolation and on the encoder side, a much greater number of potential source blocks to be evaluated.

Three-dimensional motion compensation divides up a currently encoding image into non-overlapping blocks, and computes a three-dimensional motion compensation vector that indicates where those blocks come from in a reference image. The reference blocks typically overlap in the source frame. Some video compression algorithms assemble the current image out of pieces of several different reference images in the reference image list 203. The source frame refers to the frame containing the original input pixels of the current frame. The current input frame can be predicted by multiple reference images. Sometimes, an input pixel block can be predicted by multiple reference images.

The result of the padding 202, image compression 204, motion compensation 206 and (optionally) entropy coding 208 is a coded picture 211. The motion vector MV, (and/or intra prediction mode motion vector MV') and transform coefficients 207 may be included in the coded picture 211. As each digital picture 201 undergoes padding 202, image compression 204, and motion compensation 206, it is simultaneously fed to a decoder emulator 213. The decoder emulator 213 simulates the decoding process with respect to the digital picture 202 without having available the three-dimensional motion vector associated with that particular digital picture 202. Instead, the decoder emulator 213 simply uses already decoded images and pixels (e.g., those from the reference image list 203) to independently determine a three-dimensional motion vector MV''' for the digital picture, or section thereof. The three-dimensional motion vector MV''' determined by the decoder emulator is then compared to the three-dimensional motion vector MV, MV' determined by the encoder. If the three-dimensional motion vector MV''' determined by the decoder emulator contains one or more equivalent prediction parameters to that of the three-dimensional motion vector MV, MV' derived from the encoder, then the encoder can skip those prediction parameters when transmitting the final coded picture 215. The encoder could also use the three-dimensional motion vector MV''' determined by the decoder emulator to encode additional information within the final coded picture 215 to guide the decoder in finding omitted prediction parameters. By way of example, and not by way of limitation, additional information may include: a range of values for each prediction parameter within which the decoder should search; an index of neighboring pixels within which the decoder should search to determine a motion vector MV, MV'; the difference between the encoder's three-dimensional motion vector MV, MV' and the decoder emulator's three-dimensional motion vector MV'''; or some combination thereof. By delegating some of the pixel prediction duties to the decoder, a significant number of bits may be saved in the encoding process. This allows the use of more complex prediction methods to encode digital pictures resulting in greater prediction accuracy and more efficient encoding/decoding schemes.

Figure 2B:
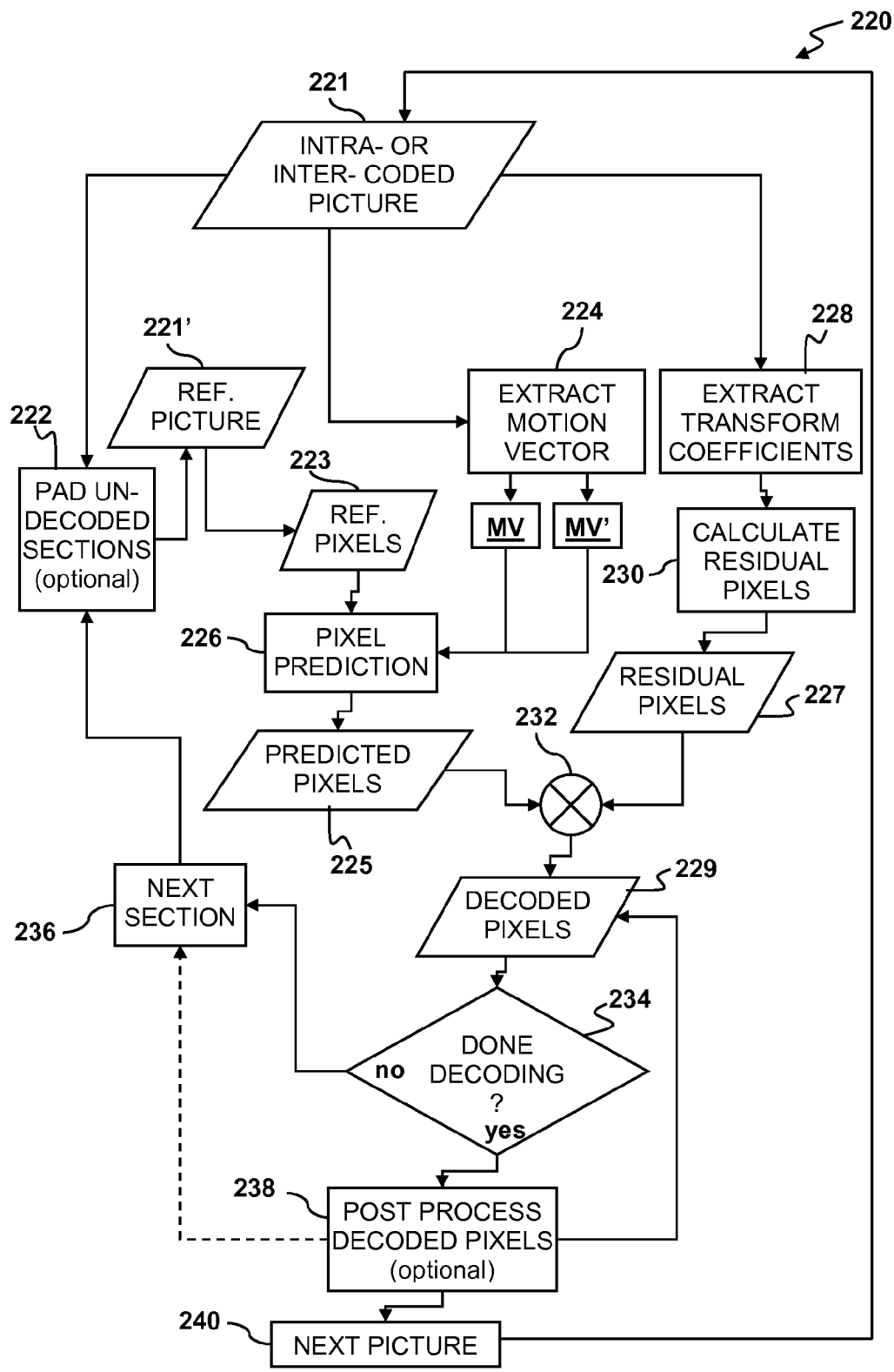
FIG. 2B is a flow diagram illustrating digital picture decoding according to an embodiment of the present invention

Once a picture has undergone encoding as shown in FIG. 2A, it may be transmitted and then decoded in accordance with another embodiment of the present invention. Picture decoding in accordance with embodiments of the present invention may proceed in accordance with a method 220 as illustrated in FIG. 2B. As indicated at 222, an un-decoded portion of the picture may be padded to produce a padded picture 221'. If the current picture 221 has been encoded as described above with respect to FIG. 2A, some components of a three-dimensional motion vector MV (or intra mode three-dimensional motion vector MV') may be extracted from the current picture 221 at 224, independent of whether the current picture is inter-coded or intra-coded. Extraction of the three-dimensional motion vector MV, MV' may be done by simply using the three-dimensional motion vector MV, MV' provided by the coded picture 221, when available. However, where the three-dimensional motion vector MV, MV' or certain prediction parameters associated with the three-dimensional motion vector MV, MV' for a given picture 221 are unavailable, the decoder may search for the motion vector MV or omitted prediction parameters by using previously decoded sections from a reference picture 221'. Depending on the type of picture coding, the reference picture may a different picture than the coded picture 221. Alternatively, the previously decoded sections may come from the coded picture 221 that is currently being decoded. The search may be guided by additional information found in the coded picture 221 (e.g., a range of values for each prediction parameter within which the decoder should search) as discussed in FIG. 2A.

It is noted that in the prior art, an inter picture could be encoded using both inter mode and intra mode functions. An intra picture, by contrast could only be encoded using the intra mode functions. In certain embodiments of the present invention both inter mode and intra mode functions may be allowed for each individual section inside an intra picture. As a result, the same data flow is used for both intra pictures and inter pictures. The advantage of this may be understood if one considers video encoding or decoding as a stage in a video processing pipeline. If encoding or decoding of intra and inter pictures use the same process and consume the same number of cycles, the whole pipeline will be smoother.

Once the motion vector MV (or MV') has been extracted, it may be used for pixel prediction 226 of an un-decoded section of the current picture 221 to generate predicted pixels 225. The pixel prediction 226 may use reference pixels 223 from the padded picture 221' as reference pixels 223. The reference pixels 223 may come from un-padded portions of the padded picture 221'. In addition, pixels obtained in the padding process 222 may also be used as reference pixels 223. The pixel prediction 226 may include both inter-prediction and intra-prediction for both inter-coded pictures and intra-coded pictures. In particular, the pixel prediction 226 may use a conventional inter mode motion vector MV or an intra mode motion vector MV' generated as described above. In conjunction with pixel prediction at 226, the decoder implementing the decoding method 220 may extract transform coefficients from the current picture 221 as indicated at 228 and calculate residual pixels 227 from the transform coefficients as indicated at 230. The predicted pixels 225 and residual pixels 227 may be combined, as indicated at 232, e.g., by simple addition, to produce decoded pixels 229.

If, at 234, decoding is not finished, decoding proceeds for the next portion of the current picture 221, as indicated at 236. Once decoding is finished, post processing may be performed on the decoded pixels 229 as indicted at 238. Examples of post processing include, but are not limited to de-blocking, natural noise reduction, coding error noise reduction, color enhancement, color space conversion, interlace progressive conversion, frame rate conversion, picture size scaling, alpha blending and 3-D object wrapping. Post processing is typically done on a section if it is far enough away from a currently processing section so that it will not be used as a source of reference pixels. Determining whether a section will be used for pixel prediction may be part of the decision at 234. Once post processing is finished for all pixels, the foregoing process may be repeated for another picture, as indicated at 240.

It is noted that the nature of the decision at 234 as to whether decoding is finished depends on whether current picture pixels are used as reference pixels before or after post processing. To achieve the best prediction it is preferable to use the current picture pixels after post processing. In such a case post processing of the pixels from the current section may take place after pixel prediction for the current section and before pixel prediction for the future section. However, to achieve the simplest implementation it is preferable to use pre-post processing pixels as reference pixels since otherwise the post processed current picture pixels would have to be fed back to each macroblock before decoding the next macroblock. In such a case, decoding of the future section may begin after the pixel prediction for the current section has been completed but before post processing of the pixels for the current section.

In a preferred embodiment, pre-post-processing pixels are used as reference pixels for same picture macroblock inter prediction. In such a case, the padding pixels may be copied from de-coded macroblocks that have not yet undergone post-processing, such as de-blocking.

In some cases, for example, intra-coded pictures and inter-coded pictures containing computer generated artificial content, using portions of the current picture as a source of reference pixels may yield a better prediction than any other prediction mode. But, according to all existing video coding standards, using the current picture as a reference is not allowed for intra-coded pictures. This may not be an obvious solution for camera-captured natural scenes or low resolution pictures, since it is less likely to have the best prediction from the current picture. However, it still benefits from the advantages of simplified process flow for both inter- and intra-coded pictures.

Figure 3:
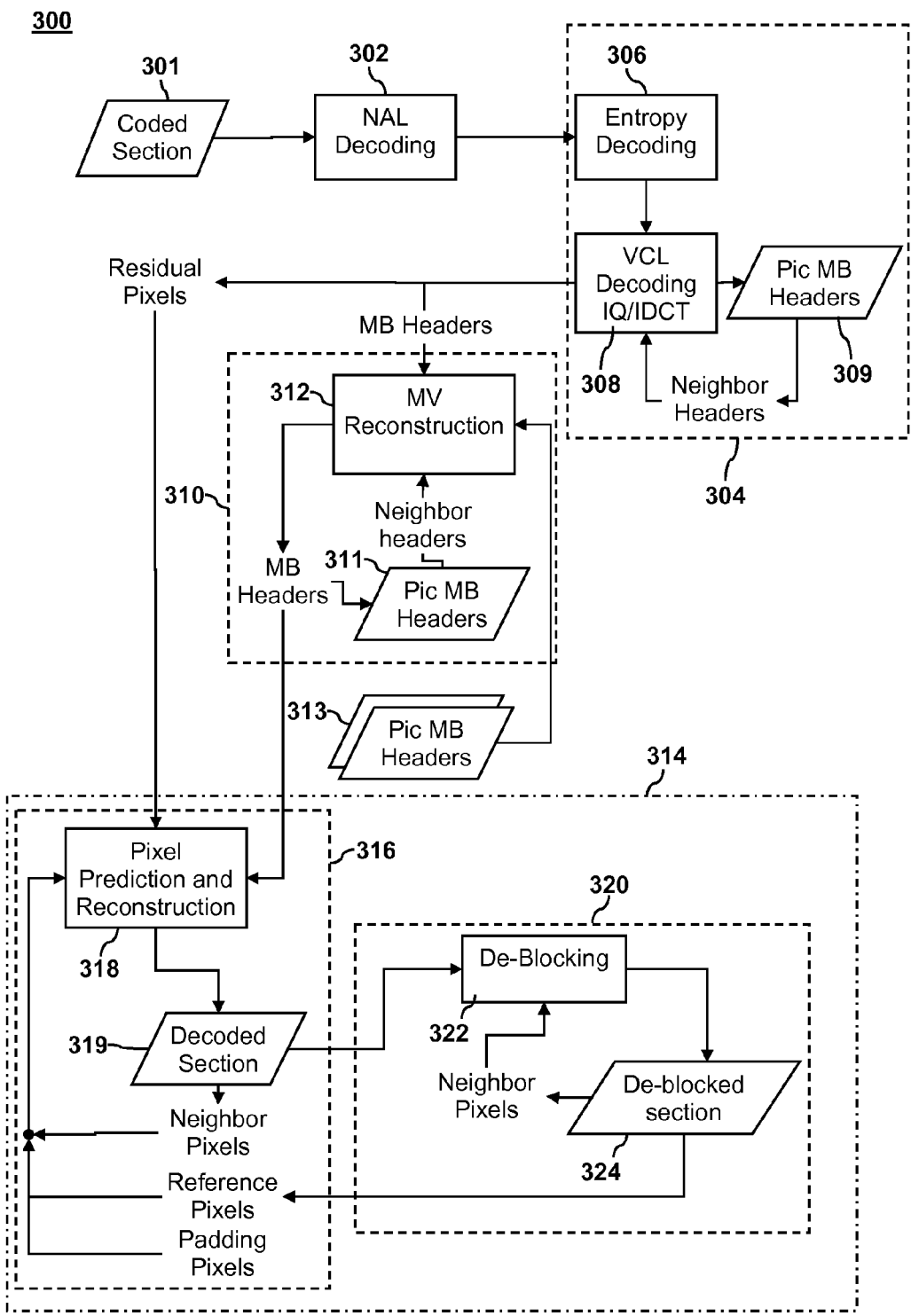
FIG. 3 is a flow diagram illustrating the general process flow in streaming data decoding

FIG. 3 illustrates an example of a possible process flow in a method 300 for decoding of streaming data 301. This particular example shows the process flow for video decoding, e.g., using the AVC (H.264) standard. The coded streaming data 301 may initially be stored in a buffer. Where coded streaming data 301 (e.g., a video data bitstream) has been transferred over a network, e.g., the Internet, the data 301 may initially undergo a process referred to as network abstraction layer (NAL) decoding, indicated at 302. NAL decoding may remove from the data 301 information added to assist in transmitting the data. Such information, referred to as a "network wrapper" may identify the data 301 as video data or indicate a beginning or end of a bitstream, bits for alignment of data, and/or metadata about the video data itself. In addition, by way of example, the network wrapper may include information about the data 301 including, e.g., resolution, picture display format, color palette transform matrix for displaying the data, information on the number of bits in each picture, slice or macroblock, as well as information used in lower level decoding, e.g., data indicating the beginning or ending of a slice. This information may be used to determine the number of macroblocks to pass to each of the task groups in a single section.

Due to its complexity, NAL decoding is typically done on a picture and slice level. The smallest NAL buffer used for NAL decoding is usually slice sized. Fortunately, the NAL decoding process 302 involves a relatively low number of cycles. Consequently, the NAL decoding process 302 may be done on a single processor.

In some embodiments, after NAL decoding at 302, the remaining decoding illustrated in FIG. 3 may be implemented in three different thread groups or task groups referred to herein as video coded layer (VCL) decoding 304, motion vector (MV) reconstruction 310 and picture reconstruction 314. The picture reconstruction task group 314 may include pixel prediction and reconstruction 316 and post processing 320. In some embodiments of the present invention, these tasks groups may be chosen based on data dependencies such that each task group may complete its processing of all the macroblocks in a picture (e.g., frame or field) or section before the macroblocks are sent to the next task group for subsequent processing.

Certain codecs may use a form of data compression that involves transformation of the pixel information from a spatial domain to a frequency domain. One such transform, among others, is known as a discrete cosine transform (DCT). The decoding process for such compressed data involves the inverse transformation from the frequency domain back to the spatial domain. In the case of data compressed using DCT, the inverse process is known as inverse discrete cosine transformation (IDCT). The transformed data is sometimes quantized to reduce the number of bits used to represent numbers in the discrete transformed data. For example, numbers 1, 2, 3 may all be mapped to 2 and numbers 4, 5, 6 may all be mapped to 5. To decompress the data a process known as inverse quantization (IQ) is used before performing the inverse transform from the frequency domain to the spatial domain. The data dependencies for the VCL IQ/IDCT decoding process 304 are typically at the macroblock level for macroblocks within the same slice. Consequently results produced by the VCL decoding process 304 may be buffered at the macroblock level.

VCL decoding 304 often includes a process referred to as Entropy Decoding 306, which is used to decode the VCL syntax. Many codecs, such as AVC (H.264), use a layer of encoding referred to as entropy encoding. Entropy encoding is a coding scheme that assigns codes to signals so as to match code lengths with the probabilities of the signals. Typically, entropy encoders are used to compress data by replacing symbols represented by equal-length codes with symbols represented by codes proportional to the negative logarithm of the probability. AVC (H.264) supports two entropy encoding schemes, Context Adaptive Variable Length Coding (CAVLC) and Context Adaptive Binary Arithmetic Coding (CABAC). Since CABAC tends to offer about 10% more compression than CAVLC, CABAC is favored by many video encoders in generating AVC (H.264) bitstreams. Decoding the entropy layer of AVC (H.264)-coded data streams can be computationally intensive and may present challenges for devices that decode AVC (H.264)-coded bitstreams using general purpose microprocessors. To decode high bit-rate streams targeted by the Blu-ray or the HD-DVD standards, the hardware needs to be very fast and complex, and the overall system cost could be really high. One common solution to this problem is to design special hardware for CABAC decoding. Alternatively, entropy decoding may be implemented in software. An example of a software implementation of entropy decoding may be found in commonly-assigned U.S. Pat. No. 7,554,468, which is incorporated herein by reference.

In addition to Entropy Decoding 306, the VCL decoding process 304 may involve inverse quantization (IQ) and/or inverse discrete cosine transformation (IDCT) as indicated at 308. These processes may decode the headers 309 and data from macroblocks. The decoded headers 309 may be used to assist in VCL decoding of neighboring macroblocks.

VCL decoding 304 may be implemented at a macroblock level data dependency frequency. Specifically, different macroblocks within the same slice may undergo VCL decoding in parallel and the results may be sent to the motion vector reconstruction task group 310 for further processing.

Subsequently, all macroblocks in the picture or section may undergo motion vector reconstruction 310. The MV reconstruction process 310 may involve motion vector reconstruction 312 using headers from a given macroblock 311 and/or co-located macroblock headers 313. Additionally, motion vector reconstruction 312 may be implemented through a guided search by the decoder, as discussed above in FIGS. 2A and 2B. A three-dimensional motion vector may describe apparent motion (e.g., 3D shift or rotation) as well as color characteristics (e.g., light strength and diffusion) within a picture. Such motion vectors allow reconstruction of a picture (or portion thereof) based on knowledge of the pixels of a prior picture and the relative motion of those pixels from picture to picture. Once the motion vector has been recovered pixels may be reconstructed at 316 using a process based on residual pixels from the VCL decoding process 304 and motion vectors from the MV reconstruction process 310. The data dependency frequency (and level of parallelism) for the MV depends on whether the MV reconstruction process 310 involves co-located macroblocks from other pictures. For MV reconstruction not involving co-located MB headers from other pictures the MV reconstruction process 310 may be implemented in parallel at the slice level or picture level. For MV reconstruction involving co-located MB headers the data dependency frequency is at the picture level and the MV reconstruction process 310 may be implemented with parallelism at the slice level.

The results of motion vector reconstruction 310 are sent to the picture reconstruction task group 314, which may be parallelized on a picture frequency level. Within the picture reconstruction task group 314 all macroblocks in the picture or section may undergo pixel prediction and reconstruction 316 in conjunction with de-blocking 320. The pixel prediction and reconstruction task 316 and the de-blocking task 320 may be parallelized to enhance the efficiency of decoding. These tasks may be parallelized within the picture reconstruction task group 314 at a macroblock level based on data dependencies. For example, pixel prediction and reconstruction 316 may be performed on one macroblock and followed by de-blocking 320. Reference pixels from the decoded picture obtained by de-blocking 320 may be used in pixel prediction and reconstruction 316 on subsequent macroblocks. Pixel prediction and reconstruction 318 produces decoded sections 319 (e.g. decoded blocks or macroblocks) that include neighbor pixels which may be used as inputs to the pixel prediction and reconstruction process 318 for a subsequent macroblock. The data dependencies for pixel prediction and reconstruction 316 allow for a certain degree of parallel processing at the macroblock level for macroblocks in the same slice.

In embodiments of the present invention, pixel prediction may use pixels from within the current picture that is being decoded as reference pixels instead of pixels from an already decoded picture. Any reference pixels that have not been decoded may be replaced by padding pixels, which may be determined from pixels within the current picture that have already been decoded. If no pixels have been decoded, the values of the padding pixels may be determined arbitrarily as discussed above.

The post processing task group 320 may include a de-blocking filter 322 that is applied to blocks in the decoded section 319 to improve visual quality and prediction performance by smoothing the sharp edges which can form between blocks when block coding techniques are used. The de-blocking filter 322 may be used to improve the appearance of the resulting de-blocked sections 324.

The decoded section 319 or de-blocked sections 324 may provide neighboring pixels for use in de-blocking a neighboring macroblock. In addition, decoded sections 319 including sections from a currently decoding picture may provide reference pixels for pixel prediction and reconstruction 318 for subsequent macroblocks. It is during this stage that pixels from within the current picture may be used for pixel prediction within that same current picture as described above, independent of whether the picture is inter-coded or intra-coded. De-blocking 320 may be parallelized on a macroblock level for macroblocks in the same picture.

The decoded sections 319 produced before post processing 320 and the post-processed sections 324 may be stored in the same buffer, e.g., the output picture buffer depending on the particular codec involved. It is noted that de-blocking is a post processing filter in H.264. Because H.264 uses pre-de-blocking macroblock as reference for neighboring macroblocks intra prediction and post-de-blocking macroblocks for future picture macroblocks inter prediction. Because both pre- and post-de-blocking pixels are used for prediction, the decoder or encoder has to buffer both pre-de-blocking macroblocks and post-de-blocking macroblocks. For most low cost consumer applications, pre-de-blocked pictures and post-de-blocked pictures share the same buffer to reduce memory usage. For standards that pre-date H.264, such as MPEG2 or MPEG4 except MPEG4 part 10, (note: H.264 is also called MPEG4 part 10), only pre-post-processing macroblocks (e.g., pre-de-blocking macroblocks) are used as reference for other macroblock prediction. In such codecs, a pre-filtered picture may not share the same buffer with a post filtered picture.

Thus, for H.264, after pixel decoding, the decoded section 319 is saved in the output picture buffer. Later, the post processed sections 324 replace the decoded sections 319 in the output picture buffer. For non-H.264 cases, the decoder only saves decoded sections 319 in the output picture buffer. The post processing is done at display time and the post processing output may not share the same buffer as the decoder output picture buffer.

For most multi-processor hardware platforms, the inter processor data access delay is shorter than the time interval between video pictures. However, only a few parallel processing engines can do inter-processor data transfer faster than the macroblock processing speed. It is acceptable to have two tasks exchange data at the picture frequency. Based on the picture frequency dependencies described above with respect to FIG. 3, it is possible to break up the decoding process 300 into five separate tasks. These tasks are A) NAL decoding 302 and decoder internal management, B) VCL syntax decoding and IQ/IDCT 304, C) motion vector reconstruction 310 and D) pixel prediction and reconstruction 316 and E) de-blocking 320.

In general, NAL decoding may be done at a picture or slice level data dependency frequency. For codecs such as AVC (H.264) the data dependencies involved in NAL decoding 302 may be fairly complex yet the overall NAL decoding process 302 may take a relatively low number of cycles. Consequently it may be more efficient to implement all NAL decoding 302 on a single processor rather than to attempt to parallelize this process. The motion vector reconstruction task 310 typically takes about one tenth as many processor cycles as for VCL syntax decoding and IQ/IDCT 304, pixel prediction and reconstruction 316 and de-blocking 320. The computational complexities of the latter three tasks are fairly similar. However, the execution cycle allocation among these three large cycle tasks is different for different coded video streams.

Within the VCL syntax decoding and IQ/IDCT 304 there are only macroblock level data dependencies within each slice. For this task, the slices may be treated as being independent of each other. The motion vector reconstruction task 310 depends on the output of the VCL syntax decoding and IQ/IDCT 304 for input. The pixel prediction and reconstruction task 316 takes the outputs of the VCL syntax decoding and IQ/IDCT task 304 and motion vector reconstruction task 310 as inputs. Within the motion vector reconstruction task 310 and pixel prediction and reconstruction task 318 there are macroblock level data dependencies, but slices within one picture are independent of each other.

The pixel prediction and reconstruction task 316 may involve motion compensation. The picture dependency in the pixel prediction and reconstruction task 316 may result from such motion compensation. As discussed above, motion compensation is a process that normally uses a previously decoded picture to predict the current picture. In the motion compensation process, a three-dimensional vector, called a motion vector, is used to reference the pixels in a previously decoded picture. The picture level dependency in the motion vector reconstruction task 310 is caused by direct prediction. In direct prediction, a previously decoded macroblock's motion vector is used to calculate the current macroblock's motion vector. Although conventionally, the referenced macroblock is in a previously decoded reference picture at the same position of the current macroblock. In embodiments of the present invention, by contrast, a section, (e.g., a block or macroblock) within the current picture may be used as the reference.

In an AVC decoder, the previously decoded reference picture is the output of the de-blocking task 320. Because of limitations on motion vector ranges defined by the coding standard, not all the pixels in the previous picture may be available to predict a certain macroblock in the current picture. For example, the motion vector range for an AVC level 4.1 stream is −512 to 511.75 pixels vertically and −1024 to 1023.75 pixels horizontally. If the picture size is 1920×1088 pixels, about one quarter of the pixels in the reference picture can be used for prediction of a corner macroblock. By contrast, almost all of the pixels in the reference picture can be used for prediction of a center macroblock.

Note that in the example depicted in FIG. 3, there is no dependency loop between the VCL decoding and IQ/IDCT task 308 and any other tasks. As such, this task may be merged into any or all of the VCL decoding task 304, motion vector reconstruction task 310 or pixel prediction and reconstruction task 316 to balance the task loads amongst available processors. Because some blocks may not have DCT coefficients, merging the IQ/IDCT task 308 into the block syntax decoding loop can allow the decoder to do IQ/IDCT only for coded blocks and reduce the number of branches.

Figure 4:
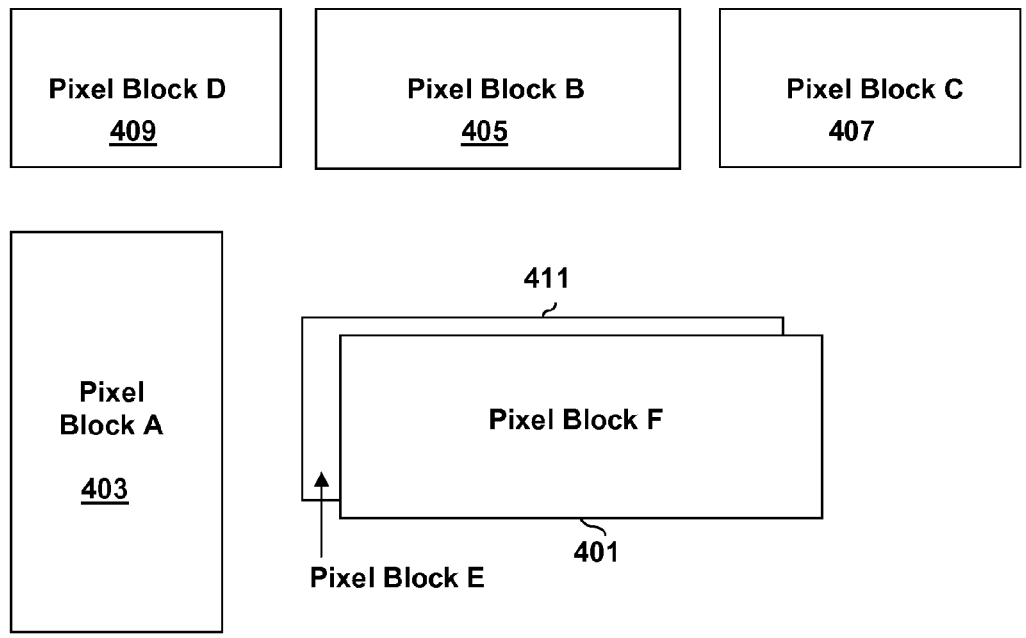
FIG. 4 is a block diagram illustrating a method for determining motion vector parameters according to an embodiment of the present invention

In the context of intra-image prediction, motion-search based prediction may not necessarily yield an accurate result even with the aid of the encoder. FIG. 4 illustrates an alternative method for intra-image prediction when a motion-search based prediction fails to provide satisfactory results.

If the reference surface of a previously decoded image is represented by a limited number of pixels with limited resolution, sub-pixel interpolation can be used to calculate the pixel value at any missing pixel position. Typically, a linear filter is used to do sub-pixel interpolation. For example, an AVC decoder may use a 6-tap filter with 3 filter parameters to perform sub-pixel interpolation. In general, more filter taps generate better results, but use more parameters. The filter should be adaptive for use with different video contents and directions. If the decoder can use neighboring decoded pixels to search for the best interpolation filter, then the encoder can skip encoding filter parameters in the stream and the use of more complex filters would become possible for image compression.

For most computer generated video sequences, the GPU uses block sizes as small as 2×2 to perform pixel prediction and reconstruction. There are advantages to allowing 2×2 block prediction, in particular greater prediction accuracy. However, in prior art video coding standards, the smallest prediction block size is 4×4, due to the prohibitive coding costs of motion vectors. In embodiments of the present invention, the coding cost of prediction parameters can be greatly reduced by avoiding the transmission of parameters that the decoder can generate independently. As a result smaller prediction block sizes become possible.

In general the first section in a given picture can be encoded or decoded using default filter parameters. However, after the first section, all future sections for that picture can use the best filter parameters searched by encoder/decoder with the reconstructed pixels and reference pixels from a previous section. Because the differences between the best filter and a suboptimal filter tends to be relatively small, it may not be necessary to transmit filter parameters. The encoder may use whatever filter that the decoder emulator can find for sub-pixel interpolation of the future section, if one exists.

FIG. 4, illustrates an example of establishing prediction parameters on the decoder side using previously decoded sections. In FIG. 4, pixel block F 401 is currently in the process of being decoded. Pixel blocks A-D 403, 405, 407, 409 are each neighboring blocks within the same image that have already been decoded. Pixel block E is a pixel block that takes the same position as pixel block F, but is located in a previously decoded picture. Each pixel block is represented by a decoded pixel matrix. In certain embodiments of the present invention, the encoder can instruct the decoder to search for some or all prediction parameters, which may include motion vectors as well as filter parameters, by using some or all of its neighboring blocks. The particular neighboring blocks used to establish prediction will be determined by the encoder via the decoder emulator, as discussed above. The decoder may then receive guidelines indicating which neighbor pixel blocks should be used to establish prediction and filter parameters from the encoder. It is important to note that the decoder may alternatively receive other information from the encoder to aid its search for prediction parameters.

There are a number of ways in which an encoder or decoder can search for filter or prediction parameters from previously decoded sections. For example, on the decoder side, or the decoder emulator inside the encoder, a candidate set of filters can be applied to a block of reference pixels used by the previous picture section prediction. Then, the output results for each of these filters can be compared with reconstructed pixels from the previous section to produce corresponding prediction errors. The best filter can be the one that generates the smallest prediction error. This best filter can be used to create predict pixels for the future section, if one exists.

Figure 5:
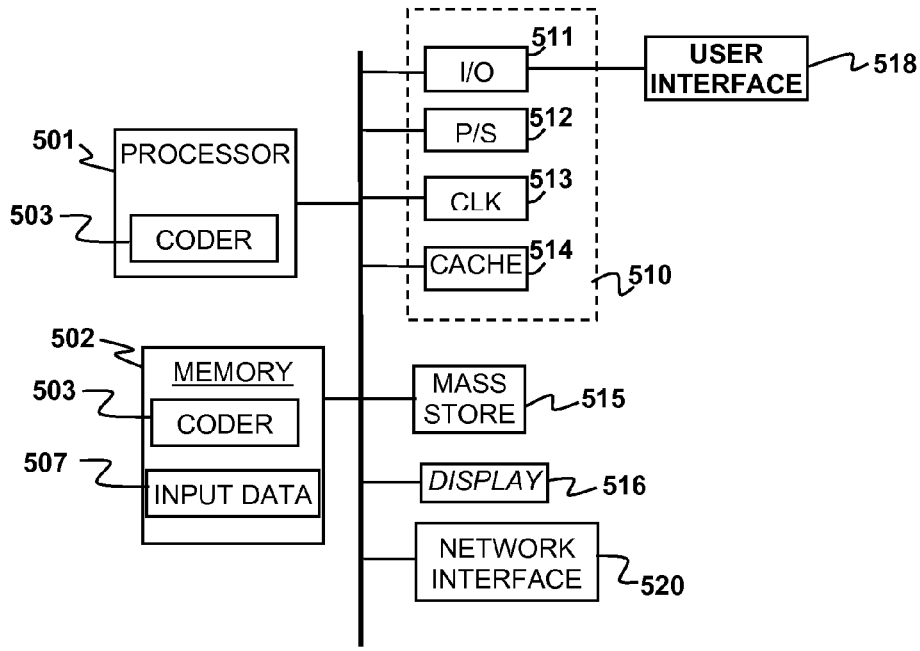
FIG. 5 is a block diagram illustrating an apparatus for encoding and/or decoding a digital picture according to an embodiment of the present invention

Embodiments of the present invention include computer apparatus configured to implement an encoder/decoder method of the type described above. By way of example, and not by way of limitation, FIG. 5 illustrates a block diagram of a computer apparatus 500 that may be used to implement a video coding scheme according to an embodiment of the present invention. The apparatus 500 generally may include a processor module 501 and a memory 502. The processor module 501 may include one or more processor cores. As an example of a processing system that uses multiple processor modules, is a Cell processor, examples of which are described in detail, e.g., in *Cell Broadband Engine Architecture*, which is available online at http://www-306.ibm.com/chips/techlib/techlib.nsf/techdocs/1AEEE1270EA2776387257060006E61BA/$file/CBEA_01_pub.pdf, the contents of which are incorporated herein by reference.

The memory 502 may be in the form of an integrated circuit, e.g., RAM, DRAM, ROM, and the like. The memory may also be a main memory that is accessible by all of the processors modules 501. In some embodiments, the processor module 501 may have local memories associated with each core. A coder program 503 may be stored in the main memory 502 in the form of processor readable instructions that can be executed on the processor modules 501. The coder program 503 may be configured to encode a picture into compressed signal data, e.g., as described above with respect to FIG. 1B and/or to decode compressed signal data, e.g., as described above with respect to FIG. 1C. The coder program 503 may be written in any suitable processor readable language, e.g., C, C++, JAVA, Assembly, MATLAB, FORTRAN and a number of other languages. The coder program 503 may include instructions configured as described below with respect to FIG. 7. In particular, the coder program 503 may include encoder-side instructions, decoder-side instructions or both encoder-side and decoder-side instructions.

Input or output data 507 may be stored in memory 502. During execution of the coder program 503, portions of program code and/or data 507 may be loaded into the memory 502 or the local stores of processor cores for processing the processor 501. By way of example, and not by way of limitation, the input data 507 may include video pictures, or sections thereof, before encoding or decoding or at intermediate stages of encoding or decoding. In the case of encoding, the data 507 may include buffered portions of streaming data, e.g., unencoded video pictures or portions thereof. In the case of decoding, the data 507 may include input data in the form of un-decoded sections, sections that have been decoded, but not post-processed and sections that have been decoded and post-processed. Such input data may include data packets containing data representing one or more coded sections of one or more digital pictures. By way of example, and not by way of limitation, such data packets may include a set of transform coefficients and a partial set of prediction parameters. These various sections may be stored in one or more buffers. In particular, decoded and/or post processed sections may be stored in an output picture buffer implemented in the memory 502.

The apparatus 500 may also include well-known support functions 510, such as input/output (I/O) elements 511, power supplies (P/S) 512, a clock (CLK) 513 and cache 514. The apparatus 500 may optionally include a mass storage device 515 such as a disk drive, CD-ROM drive, tape drive, or the like to store programs and/or data. The device 500 may also optionally include a display unit 516 and user interface unit 518 to facilitate interaction between the apparatus 500 and a user. The display unit 516 may be in the form of a cathode ray tube (CRT) or flat panel screen that displays text, numerals, graphical symbols or images. The user interface 518 may include a keyboard, mouse, joystick, light pen, or other device that may be used in conjunction with a graphical user interface (GUI). The apparatus 500 may also include a network interface 520 to enable the device to communicate with other devices over a network, such as the internet. These components may be implemented in hardware, software, or firmware, or some combination of two or more of these. There are a number of additional ways to streamline parallel processing with multiple processors in the apparatus 500. For example, it is possible to "unroll" processing loops, e.g., by replicating code on two or more processor cores and having each processor core implement the code to process a different piece of data. Such an implementation may avoid a latency associated with setting up the loop.

Figure 6:
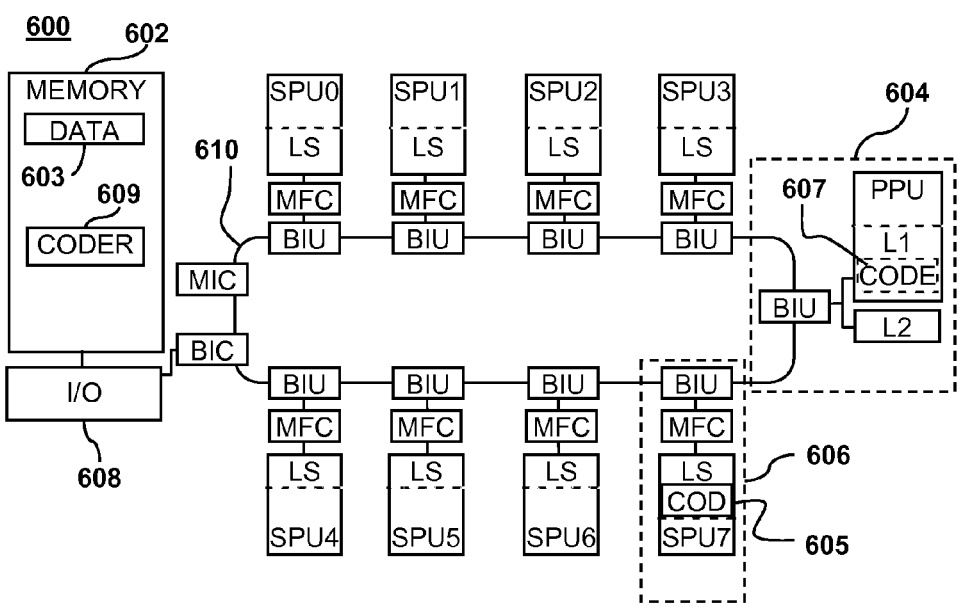
FIG. 6 is a block diagram illustrating an example of a cell processor implementation of an apparatus for encoding and/or decoding a digital picture according to an embodiment of the present invention.

One example, among others of a processing system capable of implementing parallel processing on three or more processors is a cell processor. There are a number of different processor architectures that may be categorized as cell processors. By way of example, and without limitation, FIG. 6 illustrates a type of cell processor 600 that may be used in conjunction with certain embodiments of the present invention. The cell processor 600 includes a main memory 602, a single power processor element (PPE) 604 and eight synergistic processor elements (SPE) 606. Alternatively, the cell processor 600 may be configured with any number of SPE's. The memory 602, PPE 604, and SPEs 606 can communicate with each other and with an I/O device 608 over a ring-type element interconnect bus 610. The memory 602 contains input data 603 having features in common with the input data 607 described above and a coder program 609 having features in common with the coder program 603 described above. At least one of the SPEs 606 may include in its local store (LS) decoding instructions 605 and/or a portion of the buffered input data that is to be processed in parallel, e.g., as described above. The PPE 604 may include in its L1 cache, code instructions 607 having features in common with the coder program 605 described above. Instructions 605 and data 607 may also be stored in memory 602 for access by the SPE 606 and PPE 604 when needed.

By way of example the PPE 604 may be a 64-bit PowerPC Processor Unit (PPU) with associated caches. The PPE 604 may include an optional vector multimedia extension unit. Each SPE 606 includes a synergistic processor unit (SPU) and a local store (LS). In some implementations, the local store may have a capacity of e.g., about 256 kilobytes of memory for code and data. The SPUs are less complex computational units than PPU, in that they typically do not perform any system management functions. The SPUs may have a single instruction, multiple data (SIMD) capability and typically process data and initiate any required data transfers (subject to access properties set up by a PPE) in order to perform their allocated tasks. The SPUs allow the system 600 to implement applications that require a higher computational unit density and can effectively use the provided instruction set. A significant number of SPUs in a system, managed by the PPE 604, allows for cost-effective processing over a wide range of applications. By way of example, the cell processor 600 may be characterized by an architecture known as Cell Broadband engine architecture (CBEA). In CBEA-compliant architecture, multiple PPEs may be combined into a PPE group and multiple SPEs may be combined into an SPE group. For the purposes of example, the cell processor 600 is depicted as having only a single SPE group and a single PPE group with a single SPE and a single PPE. Alternatively, a cell processor can include multiple groups of power processor elements (PPE groups) and multiple groups of synergistic processor elements (SPE groups). CBEA-compliant processors are described in detail, e.g., in *Cell Broadband Engine Architecture*, which is available online at: http://www-306.ibm.com/chips/techlib/techlib.nsf/techdocs/1AEEE1270EA2776387257060006E61BA/$file/CBEA_01_pub.pdf, which is incorporated herein by reference.

Embodiments of the invention provide systems and methods for parallel decoding of streaming data, such as encoded streaming video. Such embodiments may be applied to most video decoders, in particular, H.264/AVC decoders and, more particularly, to products that have a video decoder as a module. Examples of such products include but are not limited to video game consoles, DVD players, software (PC) video decoder/player, video on cell phones, and the like.

Figure 7:
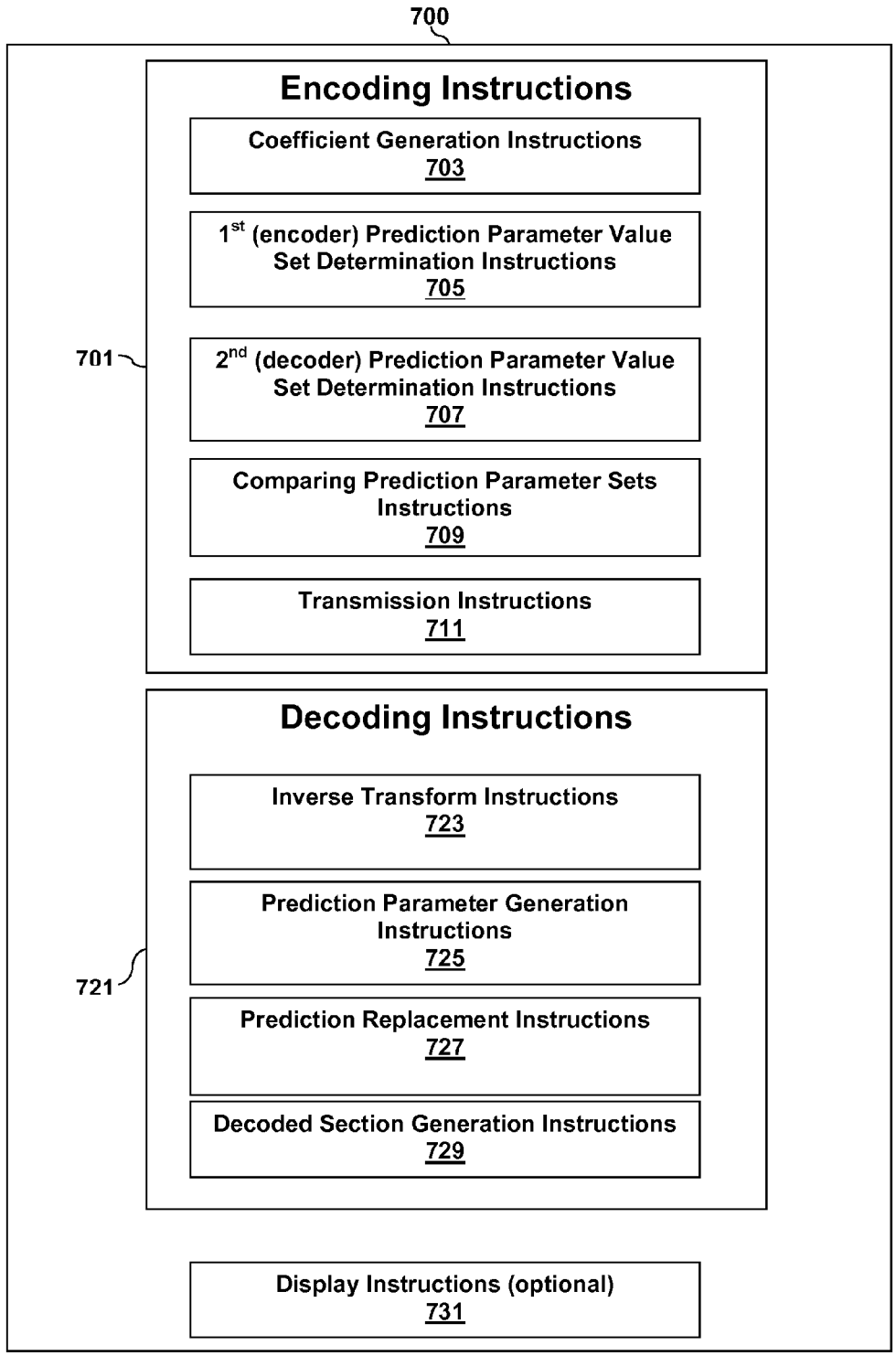
FIG. 7 illustrates an example of a non-transitory computer-readable storage medium with instructions for implementing three-dimensional motion compensation during video encoding or decoding.

According to another embodiment, instructions for three dimensional motion compensation of a digital image may be stored in a computer readable storage medium. By way of example, and not by way of limitation, FIG. 7 illustrates an example of a non-transitory computer-readable storage medium 700 in accordance with an embodiment of the present invention. The storage medium 700 contains computer-readable instructions stored in a format that can be retrieved, interpreted, and executed by a computer processing device. By way of example, and not by way of limitation, the computer-readable storage medium 700 may be a computer-readable memory, such as random access memory (RAM) or read only memory (ROM), a computer readable storage disk for a fixed disk drive (e.g., a hard disk drive), or a removable disk drive. In addition, the computer-readable storage medium 700 may be a flash memory device, a computer-readable tape, a CD-ROM, a DVD-ROM, a Blu-Ray, HD-DVD, UMD, or other optical storage medium.

The storage medium 700 contains encoding instructions 701 configured to facilitate encoding of digital images. The instructions can be encoded in a suitable programming language that can be executed by a computer processor. The storage medium may also contain decoding instructions 721 configured to facilitate decoding of digital images encoded in accordance with the encoding instructions 701. It is noted that both the encoding and decoding instructions are shown for the sake of convenience. However, this should not be construed as a limitation on the invention. Alternatively, the storage medium 700 may contain the encoding instructions 701 but not the decoding instructions 721 or only the decoding instructions 721 without the encoding instructions 701. The storage medium 700 may also optionally include display instructions 731 that can be separate from the encoding instructions 701 and decoding instructions 721.

The encoding instructions 701 may be configured to implement part of a digital picture encoding process, e.g., as described above with respect to FIG. 1A. In particular, the Encoding instructions 701 may include Coefficient Generation Instructions 703 that can generate a set of transform coefficients from a set of prediction errors for a section of a digital picture being encoded when executed. The Encoding Instructions 701 may further include a first set of Prediction Parameter Value Determination Instructions 705 that can generate a set of Prediction Parameter Values (e.g., a motion vector) on the encoder side based on a currently encoding section and a previously decoded reference section from the same or a different picture. The Encoding Instructions 701 may further include a second set of Prediction Parameter Value Determination Instructions 707 that can generate a different set of Prediction Parameter Values (e.g., a motion vector) with a decoder emulator using the predicted pixels and prediction errors of one or more previously decoded sections. The predicted pixels and prediction errors can be used to calculate re-constructed pixels. The Encoding Instructions 701 can further include a set of Comparing Prediction Parameter Sets Instructions 709 that, upon execution, compare the first set of prediction parameters with the second set of prediction parameters to identify a third set of prediction parameter values, wherein the third set of prediction parameter values includes information identifying one or more parameter values from the first set that are not in the second set. The encoding instructions 701 may further include a set of Transmission Instructions 711 that, when executed, cause the computer processor to transmit the set of transform coefficients and the third set of prediction parameter values, omitting one or more parameters that are common to both the first and second sets of prediction parameter values. It is noted that the coefficients and third set of prediction parameter values can be transmitted to a different device or transmitted to a different part of an encoding program for further processing.

The decoding instructions 721 may, when executed, cause a computer processor to decode one or more data packets containing data representing one or more coded sections of one or more digital pictures, wherein the one or more data packets include a set of transform coefficients and a partial set of prediction parameters. The decoding instructions 721 may include Inverse Transform Instructions 723 that apply an inverse transform to the transform coefficients with a decoder to generate a set of prediction error values. The decoding instructions 721 may also include a set of Prediction Parameter Generation Instructions 725 that, when executed, generate one or more estimated prediction parameter values with the decoder using the set of predicted pixels and prediction error values of one or more previously decoded sections of the one or more digital pictures. The decoding instructions 721 may also include a set of Predication Parameter Replacement Instructions 727 that, when executed cause a computer processor to replace one or more of the estimated prediction parameter values using one or more corresponding prediction parameters from the partial set of prediction parameters to produce an output set of prediction parameters. The decoding instructions 721 can also include a set of Decoded Section Generation Instructions 729 that generate one or more decoded sections with the decoder using the set of prediction error values and the output set of prediction parameters when executed.

Embodiments of the present invention provide an improved video codec that can significantly reduce the amount of data that needs to be transmitted on the encoder side or stored at the decoder side by reducing the amount of data in stored or transmitted as prediction parameter values.

Although the present invention has been described in considerable detail with reference to certain preferred versions thereof, other versions are possible. For example, although certain embodiments are described in which the prediction parameters are components of motion vectors, embodiments of the invention may include implementations in which the prediction parameters include other values, such as filter parameters, diffusion values, light strength values, chrominance, luminance, and other prediction parameter values. In addition, although certain embodiments have been described in which the transform applied to the prediction error is a discrete cosine transform (DCT), embodiments of the present invention are not limited to such implementations. Other Fourier-type transforms or wavelet transforms may also be used. Therefore, the spirit and scope of the appended claims should not be limited to the description of the preferred versions contained herein. Instead, the scope of the invention should be determined with reference to the appended claims, along with their full scope of equivalents.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. Any feature, whether preferred or not, may be combined with any other feature, whether preferred or not. In the claims that follow, the indefinite article "A", or "An" refers to a quantity of one or more of the item following the article, except where expressly stated otherwise. Any element in a claim that does not explicitly state "means for" performing a specified function, is not to be interpreted as a "means" or "step" clause as specified in 35 USC §112, ¶6. In particular, the use of "step of" in the claims herein is not intended to invoke the provisions of 35 USC §112, ¶6.

The reader's attention is directed to all papers and documents which are filed concurrently with this specification and which are open to public inspection with this specification, and the contents of any papers and documents incorporated herein by reference.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for encoding a current section of a digital picture, comprising:
    a) generating a set of transform coefficients from a set of prediction errors for a current section of a picture using an encoder device;
    b) determining a first set of one or more prediction parameter values for the current section of the digital picture using the encoder device;
    c) determining a second set of one or more prediction parameter values for the current section of the digital picture with a decoder emulator using predicted pixel and prediction error values of one or more previously decoded sections, wherein the determining the second set includes, with the decoder emulator, applying an inverse transform to the set of transform coefficients to re-generate the set of prediction errors for the current section;
    d) comparing the first set of prediction parameters with the second set of prediction parameters to identify one or more prediction parameter values common to the first set and the second set;
    z) identifying a third set of prediction parameter values, the third set of prediction parameter values being selected from the first set but omitting the prediction parameter values common to the first set and the second set; and
    e) transmitting, into a compressed stream for a decoder, the set of transform coefficients and the third set of prediction parameter values with the prediction parameter values common to the first set and the second set omitted from the compressed stream.

2. The method of claim 1, wherein the one or more prediction parameter values in the first, second, and third sets include one or more components of a three-dimensional motion vector.

3. The method of claim 2 wherein b) includes determining the three dimensional motion vector using intra-prediction.

4. The method of claim 2, wherein b) includes determining the three dimensional motion vector using inter-prediction.

5. The method of claim 2, wherein the three dimensional motion vector includes a 3-parameter vector that characterizes a three dimensional translation of the current section.

6. The method of claim 2, wherein the three dimensional motion vector includes a 3-parameter vector that characterizes a three dimensional rotation of the current section.

7. The method of claim 1, wherein the one or more prediction parameter values in the first, second, and third sets include a 3-parameter vector to characterize chrominance and luminance in the current section.

8. The method of claim 1, wherein the one or more prediction parameter values in the first, second, and third sets include a parameter that characterizes light diffusion in the current section.

9. The method of claim 1, wherein the one or more prediction parameter values in the first, second, and third sets include a parameter identifying a reference section being used in conjunction with the one or more prediction parameter values.

10. The method of claim 1, wherein e) further comprises transmitting a range of values, within which a decoder may search for parameters omitted from the third set.

11. The method of claim 1, wherein e) further comprises transmitting an index of neighboring pixels within which a decoder may search for parameters omitted from the third set.

12. The method of claim 1, wherein the third set includes a set of differences between one or more values in the first set and one or more corresponding values in the second set.

13. An apparatus for encoding a current section of a digital picture, comprising:
  a processor;
  a memory; and
  computer coded instructions embodied in the memory and executable by the processor, wherein the computer coded instructions are configured to implement a method for encoding/decoding a current section of a digital picture using three dimensional motion compensation, the method comprising:
  a) generating a set of transform coefficients from a set of prediction errors for a current section of a picture using an encoder;
  b) determining a first set of one or more prediction parameter values for the current section of the digital picture using the encoder;
  c) determining a second set of one or more prediction parameter values for the current section of the digital picture with a decoder emulator using predicted pixel and prediction errors of one or more previously decoded sections, wherein the determining the second set includes, with the decoder emulator, applying an inverse transform to the set of transform coefficients to re-generate the set of prediction errors for the current section;
  d) comparing the first set of prediction parameters with the second set of prediction parameters to identify one or more prediction parameter values common to the first set and the second set;
  z) identifying a third set of prediction parameter values, the third set of prediction parameter values being selected from the first set but omitting the prediction parameter values common to the first set and the second set; and
  e) transmitting, into a compressed stream for a decoder, the set of transform coefficients and the third set of prediction parameter values with the prediction parameter values common to the first set and the second set omitted from the compressed stream.

14. The apparatus of claim 13, wherein the one or more prediction parameter values in the first, second, and third sets include one or more components of a three-dimensional motion vector.

15. The apparatus of claim 14, wherein b) includes determining the three dimensional motion vector using intra-prediction.

16. The apparatus of claim 14, wherein b) includes determining the three dimensional motion vector using inter-prediction.

17. The apparatus of claim 13, wherein the one or more prediction parameter values include a vector that characterizes a three dimensional shift of the current section.

18. The apparatus of claim 13, wherein the one or more prediction parameter values include a vector that characterizes a three dimensional rotation of the current section.

19. The apparatus of claim 13, wherein the one or more prediction parameter values include a vector that characterizes chrominance and luminance within the current section.

20. The apparatus of claim 13, wherein the one or more prediction parameter values include a parameter that characterizes light diffusion within the current section.

21. The apparatus of claim 13, wherein the one or more prediction parameter values include a parameter that indicates a reference section being used in conjunction with the three dimensional motion vector.

22. The apparatus of claim 13, wherein the information identifying a range of values, within which the decoder may look for omitted parameters.

23. The apparatus of claim 13, wherein e) includes transmitting an index of neighboring pixels within which a decoder may look for omitted parameters.

24. The apparatus of claim 13, wherein e) includes transmitting the difference between one or more values in the first set and one or more corresponding values in the second set.

25. A computer program product comprising:
  a non-transitory computer-readable storage medium having computer readable program code embodied in said medium for, the program code including computer-executable instructions that, when executed implement a method for encoding a current section of a digital picture, said method comprising:
  a) generating a set of transform coefficients from a set of prediction errors for a current section of a picture using an encoder;
  b) determining a first set of one or more prediction parameter values for the current section of the digital picture using the encoder;
  c) determining a second set of one or more prediction parameter values for the current section of the digital picture with a decoder emulator using predicted pixels and prediction errors of one or more previously decoded sections, wherein the determining the second set includes, with the decoder emulator, applying an inverse transform to the set of transform coefficients to re-generate the set of prediction errors for the current section;
  d) comparing the first set of prediction parameters with the second set of prediction parameters to identify one or more prediction parameter values common to the first set and the second set;
  z) identifying a third set of prediction parameter values, the third set of prediction parameter values being selected from the first set but omitting the prediction parameter values common to the first set and the second set; and
  e) transmitting, into a compressed stream for a decoder, the set of transform coefficients and the third set of prediction parameter values with the prediction parameter values common to the first set and the second set omitted from the compressed stream.

26. A picture decoding method for decoding one or more data packets containing data representing one or more coded sections of one or more digital pictures, wherein the one or more data packets include a set of transform coefficients and a partial set of motion vectors, the method comprising:
  a) applying an inverse transform to the transform coefficients with a decoder device to generate a set of prediction error values;
  b) estimating one or more estimated motion vectors with the decoder device from a set of predicted pixel and prediction error values of one or more previously decoded sections of the one or more digital pictures; and
  c) replacing one or more of the estimated motion vectors with the decoder device with one or more corresponding motion vectors from the partial set of motion vectors to produce an output set of motion vectors; and d) generating one or more decoded sections with the decoder device using the set of prediction error values and the output set of motion vectors.

27. The method of claim 26, further comprising displaying one or more decoded digital pictures containing the one or more decoded sections on a display.

28. The method of claim 26, wherein a) includes determining a best forward transform from the prediction error values and applying a corresponding inverse transform to the transform coefficients.

29. The method of claim 26, wherein a) includes applying a default inverse transform to transform coefficients for a first section in the one or more digital pictures.

30. The method of claim 26, wherein the motion vectors are three-dimensional motion vectors.

31. The method of claim 26, wherein the one or more data packets include a range of values, and wherein d) includes searching within the range for motion vectors omitted from the partial set.

32. The method of claim 26, wherein the data packets include an index of neighboring pixels and wherein c) includes searching for motion vectors omitted from the partial set using the index.

33. The method of claim 26, wherein the data packets include a set of motion vector value differences and wherein c) includes combining the differences with the estimated motion vectors.

34. An apparatus for decoding a current section of a digital picture using three dimensional motion compensation, comprising:
   a processor;
   a memory; and
   computer coded instructions embodied in the memory and executable by the processor, wherein the computer coded instructions are configured to implement a method for decoding one or more data packets containing data representing one or more coded sections of one or more digital pictures, wherein the one or more data packets include a set of transform coefficients and a partial set of motion vectors, the method comprising:

a) applying an inverse transform to the transform coefficients with a decoder to generate a set of prediction error values;

b) estimating one or more estimated motion vectors with the decoder from a set of predicted pixel and prediction error values of one or more previously decoded sections of the one or more digital pictures; and c) replacing one or more of the estimated motion vectors with the decoder with one or more corresponding motion vectors from the partial set of motion vectors to produce an output set of motion vectors; and d) generating one or more decoded sections with the decoder using the set of prediction error values and the output set of motion vectors.

35. A computer program product comprising:
a non-transitory computer-readable storage medium having computer readable program code embodied in said medium, the program code including computer-executable instructions that, when executed, implement a method for decoding one or more data packets containing data representing one or more coded sections of one or more digital pictures, wherein the one or more data packets include a set of transform coefficients and a partial set of motion vectors, the method comprising:

a) applying an inverse transform to the transform coefficients with a decoder to generate a set of prediction error values;

b) estimating one or more estimated motion vectors with the decoder from a set of predicted pixel and prediction error values of one or more previously decoded sections of the one or more digital pictures; and c) replacing one or more of the estimated motion vectors with the decoder with one or more corresponding motion vectors from the partial set of motion vectors to produce an output set of motion vectors; and d) generating one or more decoded sections with the decoder using the set of prediction error values and the output set of motion vectors.

* * * * *